US012679028B2

(12) United States Patent
Murphey et al.

(10) Patent No.: US 12,679,028 B2
(45) Date of Patent: Jul. 14, 2026

(54) IN SPACE ASSEMBLY

(71) Applicant: Opterus Research and Development Inc., Fort Collins, CO (US)

(72) Inventors: Thomas W. Murphey, Fort Collins, CO (US); Carter Fortuin, Fort Collins, CO (US)

(73) Assignee: Opterus Research and Development, Inc., Fort Collins, CO (US)

( * ) Notice: Subject to any disclaimer, the term of this patent is extended or adjusted under 35 U.S.C. 154(b) by 53 days.

(21) Appl. No.: 18/908,308

(22) Filed: Oct. 7, 2024

(65) Prior Publication Data

US 2025/0026495 A1 Jan. 23, 2025

Related U.S. Application Data

(62) Division of application No. 17/646,939, filed on Jan. 4, 2022, now Pat. No. 12,208,926.

(60) Provisional application No. 63/135,903, filed on Jan. 11, 2021.

(51) Int. Cl.

| | |
|---|---|
| *B29C 64/209* | (2017.01) |
| *B29C 64/165* | (2017.01) |
| *B64G 1/22* | (2006.01) |
| *B33Y 10/00* | (2015.01) |
| *B33Y 30/00* | (2015.01) |

(52) U.S. Cl.
CPC .......... *B29C 64/209* (2017.08); *B29C 64/165* (2017.08); *B64G 1/2225* (2023.08); *B33Y 10/00* (2014.12); *B33Y 30/00* (2014.12)

(58) Field of Classification Search
CPC ........ B64G 4/00; B64G 1/222; B29C 64/165; B29C 64/209; B29C 64/118
See application file for complete search history.

(56) References Cited

U.S. PATENT DOCUMENTS 10,675,811 B1 * 6/2020 Kemmer ............... B29C 64/118

OTHER PUBLICATIONS

Deployable Composite Booms (DCB), NASA, https:/www.nasa.gov/directorates/spacetech/game_changing_development/projects/dcb (Year: 2020).*

* cited by examiner

*Primary Examiner* — JaMel M Nelson
*Assistant Examiner* — Erica Hartsell Funk
(74) *Attorney, Agent, or Firm* — Harris Beach Murtha Cullina PLLC

(57) ABSTRACT

A method of in-space assembly includes: providing a roll of spooled high strength composite (HSC) boom, a robotic arm, and a printhead disposed at about an end of the robotic arm, the roll of spooled high strength composite boom feedingly coupled to the printhead; positioning the robotic arm; dispensing from the roll of spooled high strength composite boom a length of high strength composite boom; positioning again the robotic arm; dispensing another length of high strength composite boom from the roll of spooled high strength composite boom or from another roll of spooled high strength composite boom; joining by the printhead; and repeating said step of positioning to said step of joining until a desired structure is assembled in part or in whole. A system for in-space assembly and printhead to print struts for in-space assembly are also described.

12 Claims, 32 Drawing Sheets

CASM architecture and technology components.

CASM architecture and technology components.

Feedstock length and numbers of spools required as a function of boom length.

CART arm roll stowed and analysis results showing high stiffness and dexterity.

components and resulting truss joint

FIG. 5A
Deployable Boom Technical Specifications
| Optical Boom Technology | Minimum Diameter/ Length / mm | Maximum Diameter/ Length / m | Precision | Cost |
|---|---|---|---|---|
| Slit Tube | 5 / 120 mm | 0.2 / 20 m | Low | Ultra Low |
| Living Hinge Boom | 10 / 250 mm | 0.06 / 12 m | Medium | Very Low |
| CTM | 20 / 500 mm | 0.7 / 140 m | High | Low |
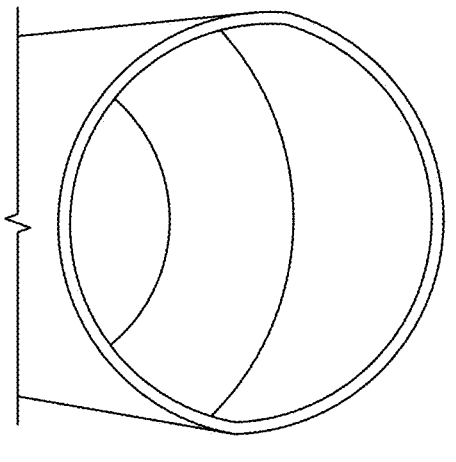
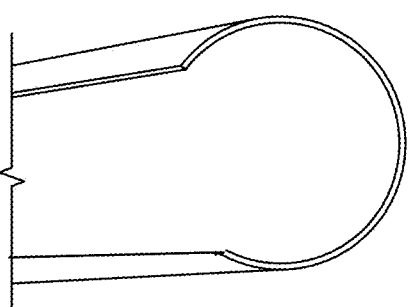
FIG. 5B

Longeron joint from four bay MTS prototype exterior (left) and interior glide plane (right)

Four bay MTS prototype

400 Rivets in 10 in x 10 in

1499

1601

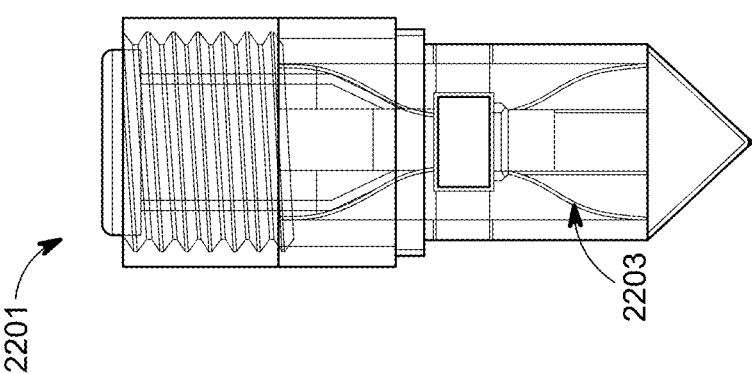
2201
2203
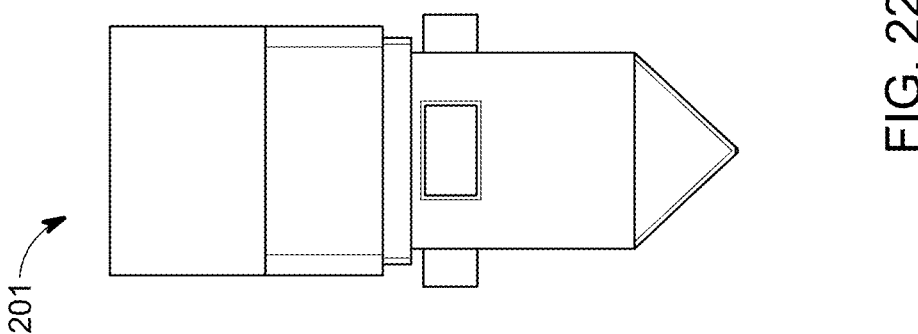
2201
FIG. 22
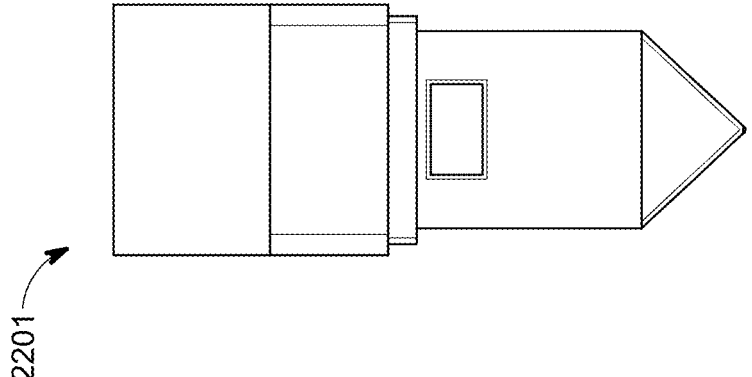
2201

2601

2603

Robotic Arm with 3 Rotational Axis

Truss Assembly Concept with Alignment Collar

Robotic Arm

Alignment Collar

IN SPACE ASSEMBLY

CROSS-REFERENCE TO RELATED APPLICATIONS

This application claims priority to and the benefit of co-pending U.S. patent application Ser. No. 17,646,939, IN SPACE ASSEMBLY filed Jan. 4, 2022, which claims the benefit of 63/135,903, IN SPACE ASSEMBLY, filed Jan. 11, 2021, which applications are incorporated herein by reference in their entirety.

FIELD OF THE APPLICATION

The application relates to in space assembly and manufacturing, particularly to in space assembly of struts by robotic arm.

BACKGROUND

Transport of relatively large, assembled structures can be impractical, costly, and in many cases of transport into space, impossible. In space assembly transports compact materials to space for later assembly on orbit or beyond orbit.

SUMMARY

A method of in-space assembly includes: providing a roll of spooled high strength composite (HSC) boom, a robotic arm, and a printhead disposed at about an end of the robotic arm, the roll of spooled high strength composite boom feedingly coupled to the printhead; positioning the robotic arm; dispensing from the roll of spooled high strength composite boom a length of high strength composite boom; positioning again the robotic arm; dispensing another length of high strength composite boom from the roll of spooled high strength composite boom or from another roll of spooled high strength composite boom; joining by the printhead the length of high strength composite boom to the another length of high strength composite boom; and repeating said step of positioning to said step of joining until a desired structure is assembled in part or in whole.

The step of positioning can include positioning by bending and twisting the robotic arm.

The step of joining can include joining by a mechanical fastener. The step of joining can include joining by a blind rivet or grommet mechanical fastener. The step of joining can include joining by a lever tooth rivet. The step of joining can include joining by a linear spring rivet. The step of joining can include joining by a push rivet with extending teeth.

The step of dispensing can include dispensing from the roll of spooled high strength composite boom the length of high strength composite boom including a plurality of holes along a longitudinal axis of the high strength composite boom and the step of joining can include joining by the printhead the length of high strength composite boom to the another length of high strength composite boom by inserting a mechanical fastener into aligned holes of two or more high strength composite booms.

A system for in-space assembly includes at least one robotic arm, and at least one HSC boom dispenser. At least one printhead is mechanically coupled at about an end of the robotic arm, the printhead feedingly coupled to the at least one HSC boom dispenser. The at least one printhead joins two or more dispensed lengths of HSC booms. The printhead is fed by a feedstock of a spooled high strength composite boom of the at least one HSC boom dispenser. The at least one printhead joins two or more lengths of HSC boom as part of an in-space assembly of a structure.

The robotic arm can include an arm position set by a combination of twisting and bending.

The spooled high strength composite boom can include a braided thin-ply tape. The spooled high strength composite boom can include a reinforcement layer affixed on one or both sides of a compressed and bent HSC boom joint area. HSC booms can provide a plurality of lengths of high strength composite struts.

The structure can include a tensioned aligned antenna structure. The structure can include a solar array. The structure can include des a parabolic mirror or a parabolic reflector.

A printhead to print struts for in-space assembly includes a printhead frame. Two or more feedstock wheels are feedingly coupled to the printhead frame to accept a feedstock sleeve from a HSC boom dispenser.

The printhead can further comprise a shear mechanically coupled to said printhead frame to cut lengths of struts.

The printhead can further comprise at least one holding and fusing clamp to form ends of printed struts and to join formed printed struts to together to build a structure. The fusing clamp can include fusing by a thermo bonding.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

FIG. 5A is a table of exemplary deployable boom technical specifications.

FIG. 5B is a drawing showing exemplary suitable HSC Boom Cross Sections;

FIG. 22 is a drawing showing an exemplary linear spring rivet suitable for use with a printhead according to the Application;

DETAILED DESCRIPTION

Definitions

PRINTHEAD-A printhead as used herein joins to sections of HSC boom. In many of the example described in more detail hereinbelow, sections of HSC boom are joined by placing a fastener through a hole in each of the sections of HSC boom to be joined. The holes can be premade and pre-exist in the HSC booms. Or, the holes can be made as part of the joining process, such as, for example, by a print head with a hole drilling, hole punching, or hole cutting feature. The holes can be of any suitable shape, including circular, square, about square (with rounded corners), etc. The primary role of the printhead is to join two or more sections of a HSC boom together. The joint can be mechanical, such as, for example by mechanical fastener (e.g. a blind grommet), a fusion method, such as, as for example, by heat applied at the joint, or by any suitable chemical means, including any suitable joining material including adhesives, glues, epoxies, etc. Suitable fusion techniques include, for example, thermo forming, and thermo bonding, such as, for example, with a polyetheretherketone (PEEK).

DISPENSING SYSTEM—There can be one or more (i.e. multiple) dispensing systems which dispense a length of high strength composite boom from one or more rolls of spooled high strength composite boom. The cutting mechanism for dispensed lengths of HSC booms can either be a part of the dispensing system, a separate component, or a part of the printhead on the robotic arm.

Figure 1A:
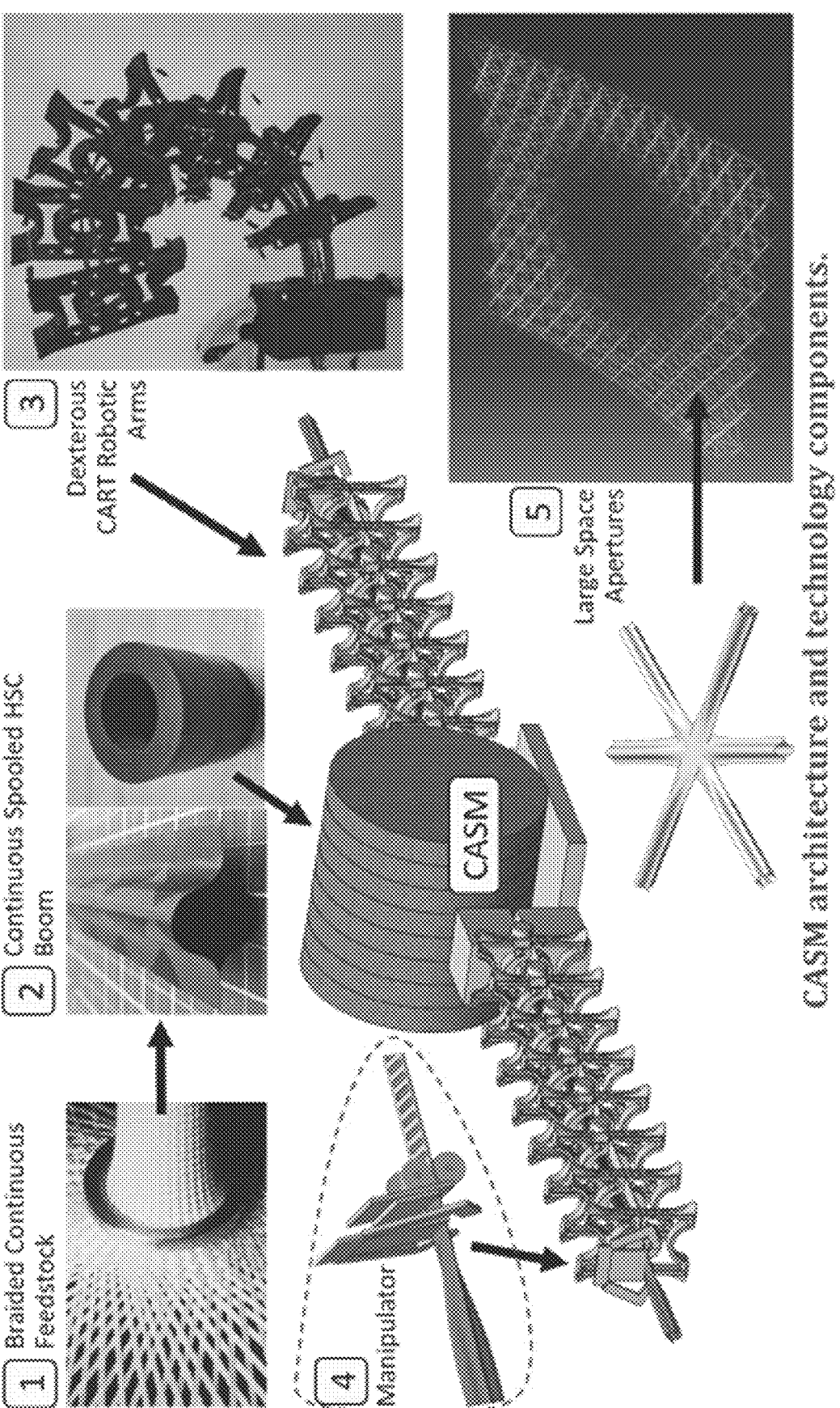
FIG. 1A is a drawing showing an exemplary Composite Aperture In-Space Manufacturing (CASM) architecture and technology components.

The Application describes new systems and methods for in space assembly and manufacturing. An exemplary system and method for in space assembly according to the Application includes the Composite Aperture In-Space Manufacturing (CASM) approach for in space manufacturing of large apertures. FIG. 1 shows an exemplary CASM architecture and technology components. Exemplary components include a braided continuous feedstock, a continuous spooled HSC boom, one or more CART robotic arms, one or more printheads (not shown in FIG. 1), and large space apertures. Structures can be manufactured on orbit using rolls of premade high-performance composite struts. These struts can be, for example, HSC booms made in a roll-to-roll pultrusion process. The feedstock can be made from braided spread tow (thin ply) composite materials. Thin ply materials offer higher strength and laminate tailorability, while keeping total thickness quite thin to reduce mass. The boom can also be made from metals and other plastics.

Figure 1B:
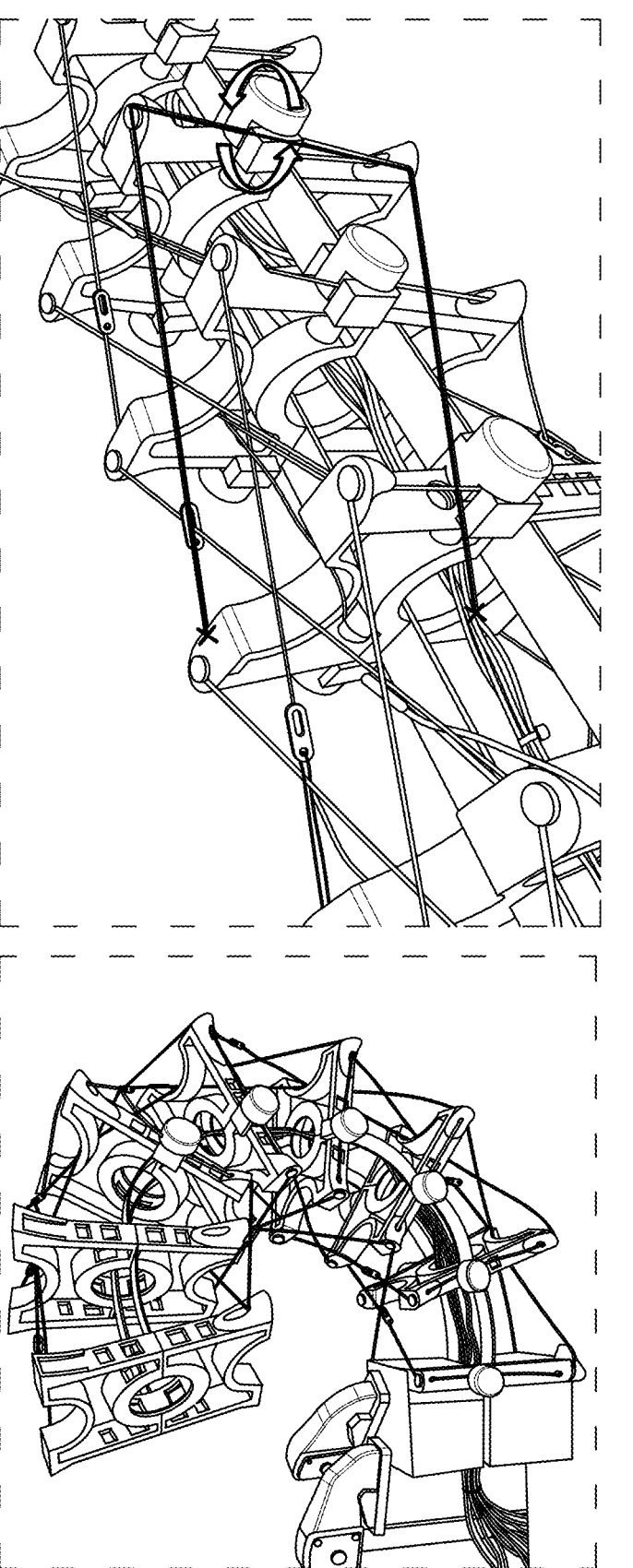
FIG. 1B is a drawing showing an exemplary implementation of a CART arm with programmed bending and twisting and showing tendon lacing over capstan drive motors.

CASM can use, for example, highly dexterous CART (continuum actuated redundant tendon) robotic arms in a crawler or inch worm configuration. Spools of feedstock boom can be stored in the center body of a crawler or on the ends at the printhead. A reconfigurable robotic arm has been implemented in prototype form. FIG. 1B is a drawing showing an exemplary implementation of a CART arm with programmed bending and twisting and showing tendon lacing over capstan drive motors. The arm is unique in that it uses a flexible continuum backbone structure and is locally actuated with tendon loops along its length. The CART robotic arm exhibits characteristics similar to continuum and soft robotics in that it is highly dexterous, reliable, and resilient. Even when several degrees of freedom are degraded, the CART robotic arm retains a high degree of functionality. However, in contrast these robots, CART was shown to be stiff, can push with significant force, and moves fast. Several gates including walking, crawling, slithering, climbing, and hopping have been shown to be feasible in a six arm CART robot.

While initial experimentation used a CART arm, any suitable robotic arm can be used to perform the new CASM method according to the Application.

Figure 2:
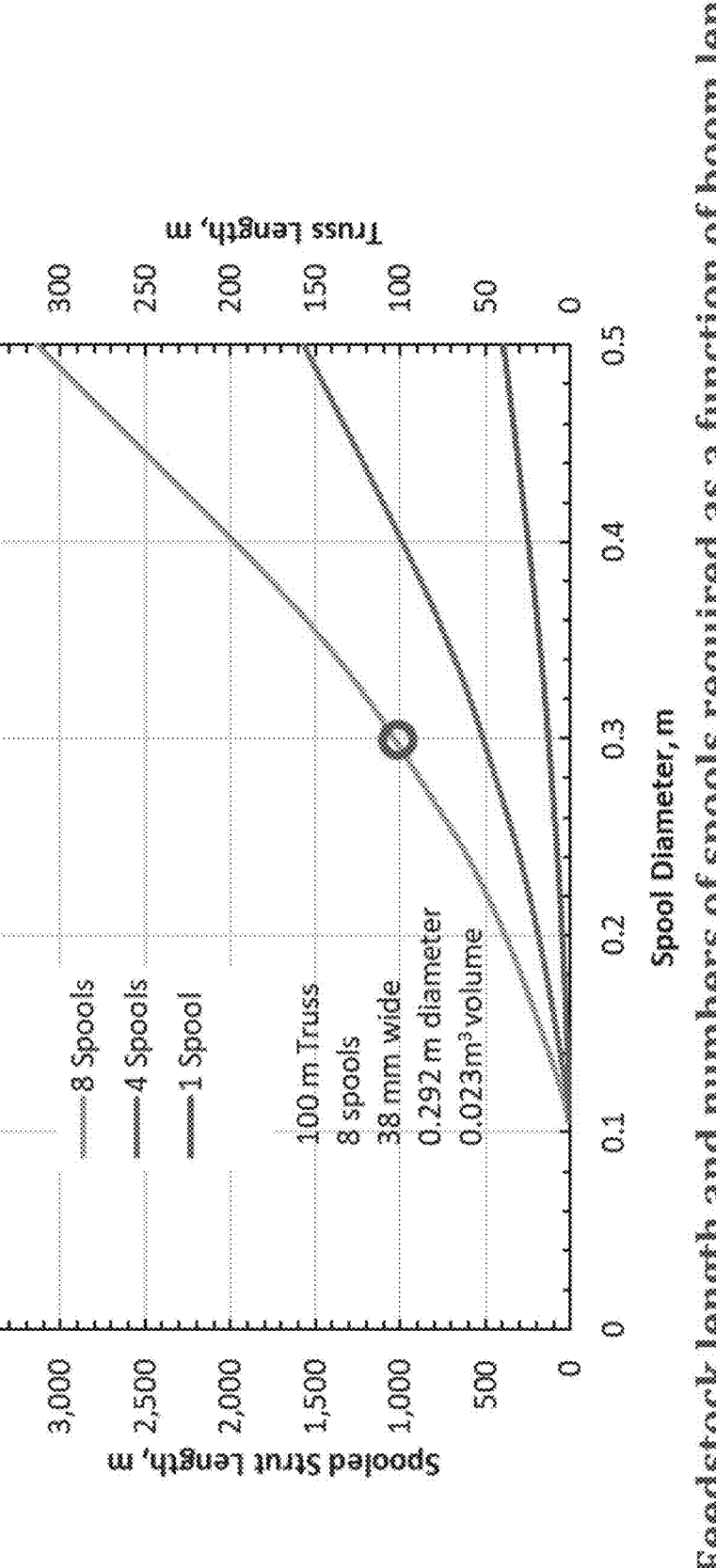
FIG. 2 is a drawing showing an exemplary CASM system with 8 spools of appropriately sized boom.

FIG. 2 is a drawing showing an exemplary CASM system with 8 spools of appropriately sized boom. The exemplary CASM system of FIG. 2 is sufficient to construct a 100 m long truss.

Figures 3, 4:
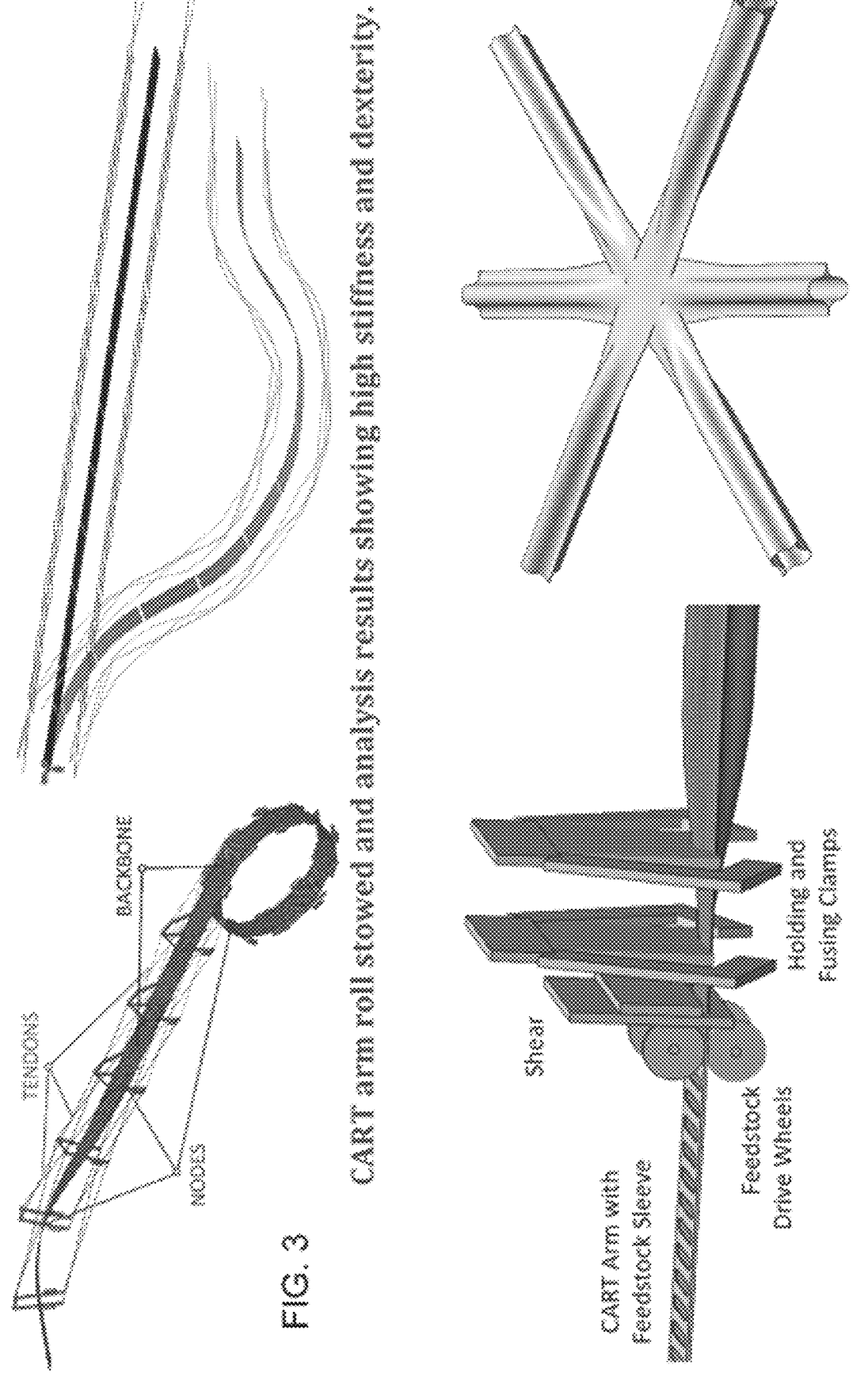
FIG. 3 shows an exemplary CART arm roll stowed and analysis results showing high stiffness and dexterity.
FIG. 4 is a drawing showing exemplary CASM components and a resulting truss joint.

FIG. 3 shows an exemplary CART arm roll stowed and analysis results showing high stiffness and dexterity. As shown in FIG. 3, CART arms can package by rolling up, resulting in an extremely compact system. The HSC boom feedstock travels flattened in a flexible sleeve from the central spools to the end of the CART arm where a printhead connects boom segments and trims them to length.

A performance metric often used for space deployable structures is the ratio of the deployed length to the initial length. A linear expansion ratio of 50 is considered common and 100 is regarded as extremely difficult to achieve with deployable technologies. With a packaged length of ~0.5 m and deployed length of 100 m, CASM surpasses the performance of most deployable structures with a linear expansion of 200.

Space structure architecture development can be combined with the new in space assembly according to the Application. For example, CASM can manufacture efficient space structures that are composed of thin shell struts. The thin shell strut geometry is not readily made by FDM or other processes that result in thick or solid circular strut geometry.

FIG. 4 is a drawing showing exemplary CASM components and a resulting truss joint. CASM can fabricate an aperture structure using the printhead shown in FIG. 4. The printhead includes features for driving or feeding the stock, trimming the stock to length with a shear, gripping the structure, and thermally bonding the structure. It results in a joint similar to that shown in FIG. 4. In a truss form, the batten and diagonal struts would wrap around longeron struts to form a curved joint. The joint can also be made with any mechanical fastener suitable for robotic assembly.

FIG. 5A is a table of exemplary deployable boom technical specifications. FIG. 5B is a drawing showing exemplary suitable HSC Boom Cross Sections; (From Left to Right) Slit-Tube, Living Hinge Boom, CTM. These booms can be made in various cross sections and sizes depending on the mission and are used in deployable spacecraft structures. Suitable uses range from radio frequency platforms (phased array antennas and parabolic reflectors) for target identification and tracking, synthetic aperture radar, and communications, to high power solar arrays, optical/RF shields, sails, camera booms, etc. Such deployable booms are also an ideal feed stock for on orbit manufacturing of large space structures.

Figure 6:
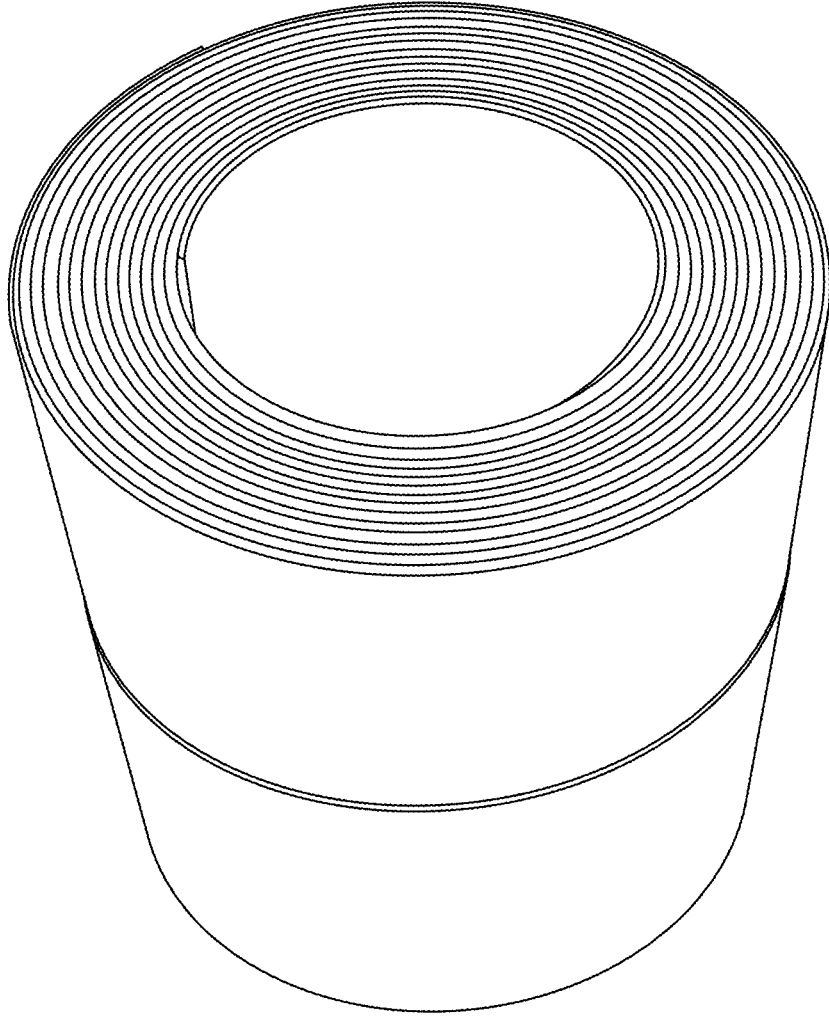
FIG. 6 is a drawing showing an exemplary packaging of a rolled HSC slit tube.

HSC booms offer high axial stiffness and strength, high dimensional stability (low coefficient of thermal expansion), and the very low density of high-performance carbon fiber composites. Their greatest feature is that they can be flattened and rolled to offer the industry's highest compaction ratio in a deployable structure. When rolled, HSC booms achieve near optimal packaging density with no dead/unused space. HSC boom material rolls are as dense as the bulk/solid material. FIG. 6 is a drawing showing an exemplary packaging of a rolled HSC slit tube.

HSC BOOM FEED STOCK FABRICATION—Thin-ply fabric preforms can be braided and braided thin-ply composite boom feedstock manufactured therefrom.

BRAIDED THIN-PLY TAPES—Braided thin-ply materials have been developed that can be directly applied to the development thin-gauge composite space structures by the High Strain Composites (HSCs) industry and NASA alike. Exemplary braided thin-ply preforms from spread tow intermediate modulus carbon fiber, prepregged the preforms with high-temperature epoxy resin and processed deployable composite tape spring have been demonstrated. Booms for in space assembly can be fabricated and cured (typically on the ground) with thermo setting epoxies. Booms can also be made by thermo forming, thermo forming shells to shape, and thermo bonding the shells, such as, for example, with a polyetheretherketone (PEEK). Use of braided thin-ply tape preforms resulted in a 10× reduction in composite component manufacturing time. Additionally, multiscale analytical workflows were developed and evaluated against the goal of enabling prediction of carbon fiber tow angles in the braided, flattened thin-ply feedstocks. Spread tow specific braiding machine hardware can optimize braided thin-ply tape quality, and to also improve efficiency of multiscale frameworks to predict braided material geometry and its impact on greater structural performance.

Figure 7:
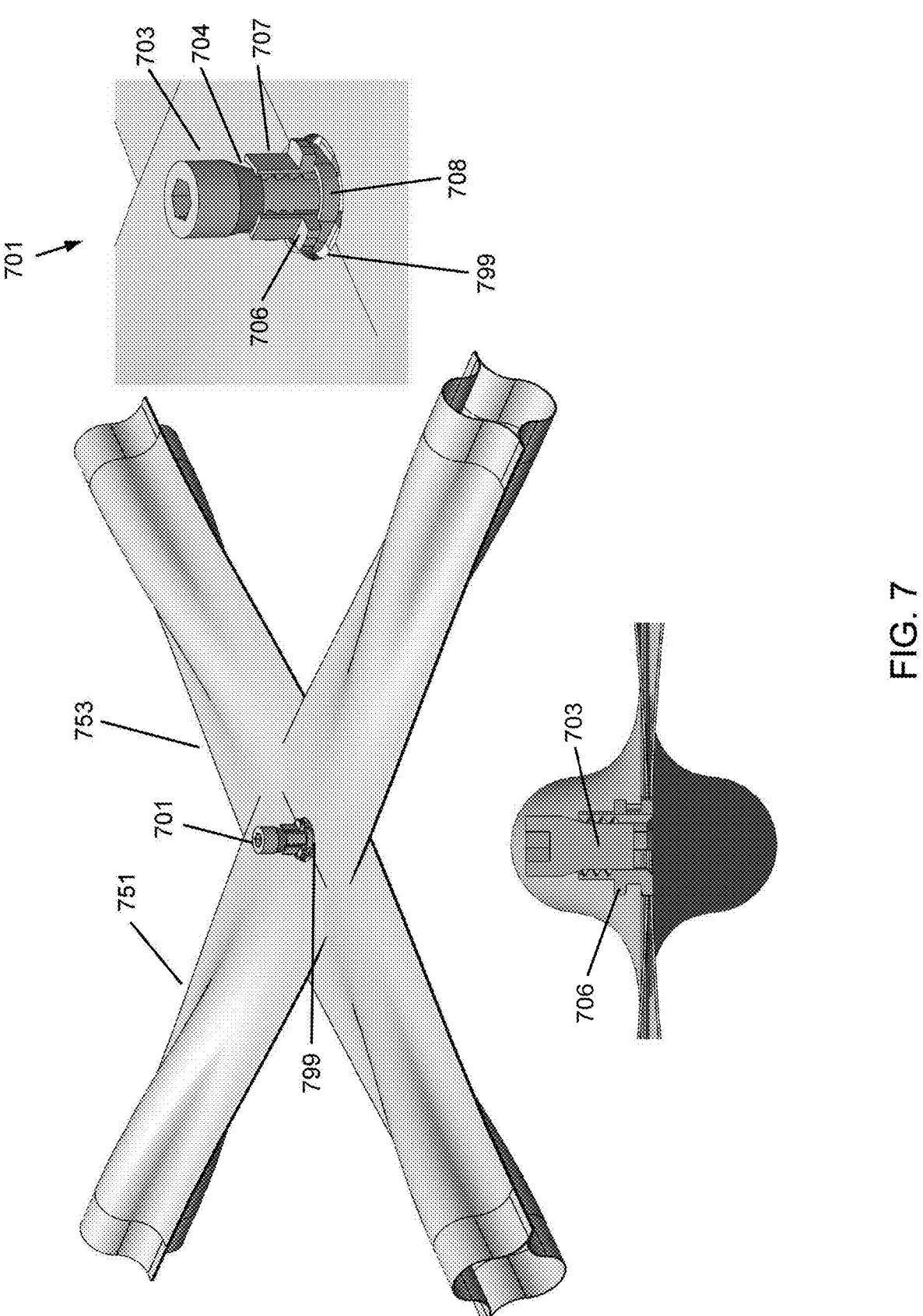
FIG. 7 is a drawing showing the blind grommet placed in a hole through both struts to be fastened together.
Figure 8:
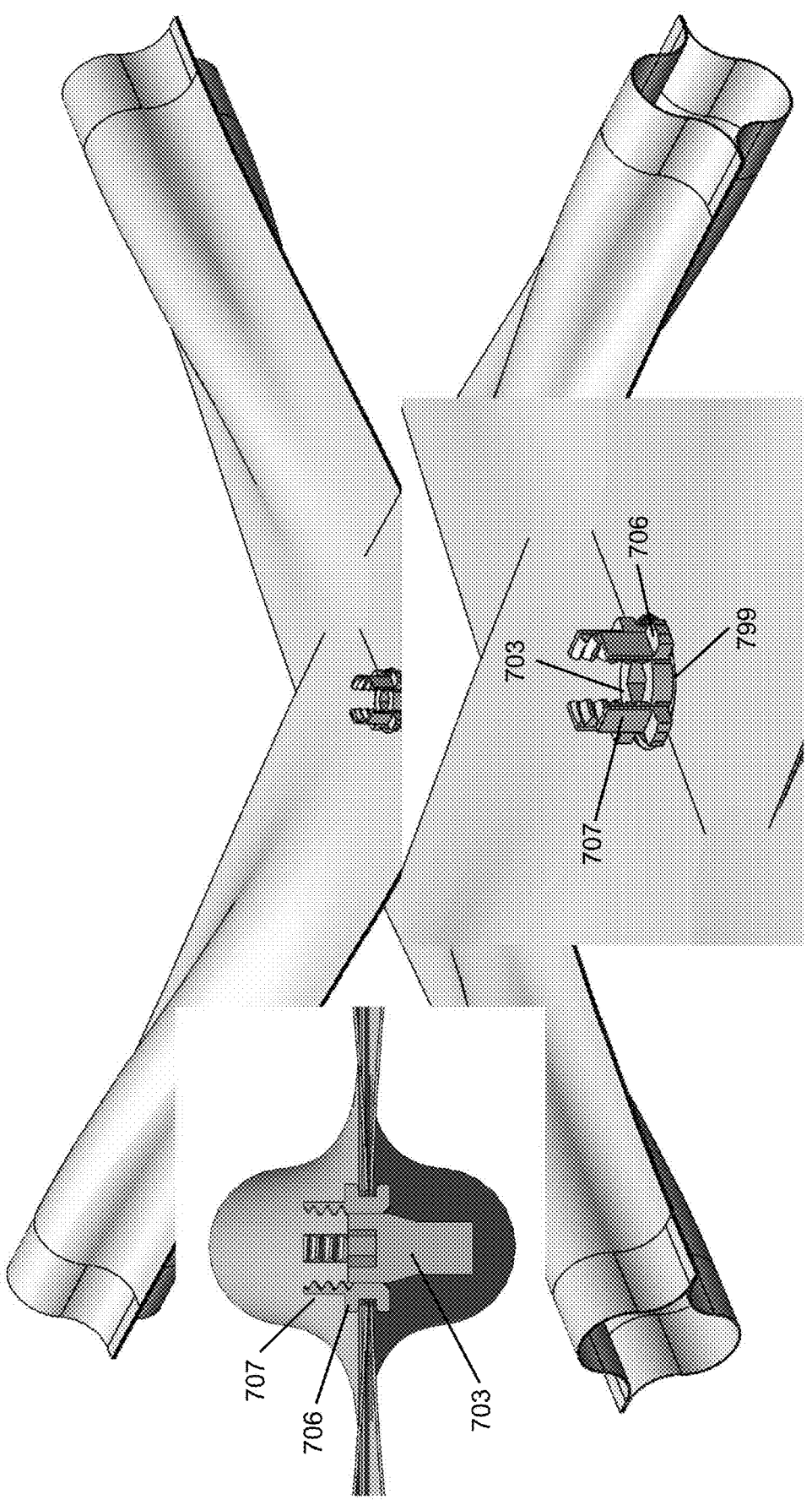
FIG. 8 is a drawing showing the expanding operation of the blind grommet of FIG. 7.
Figure 9:
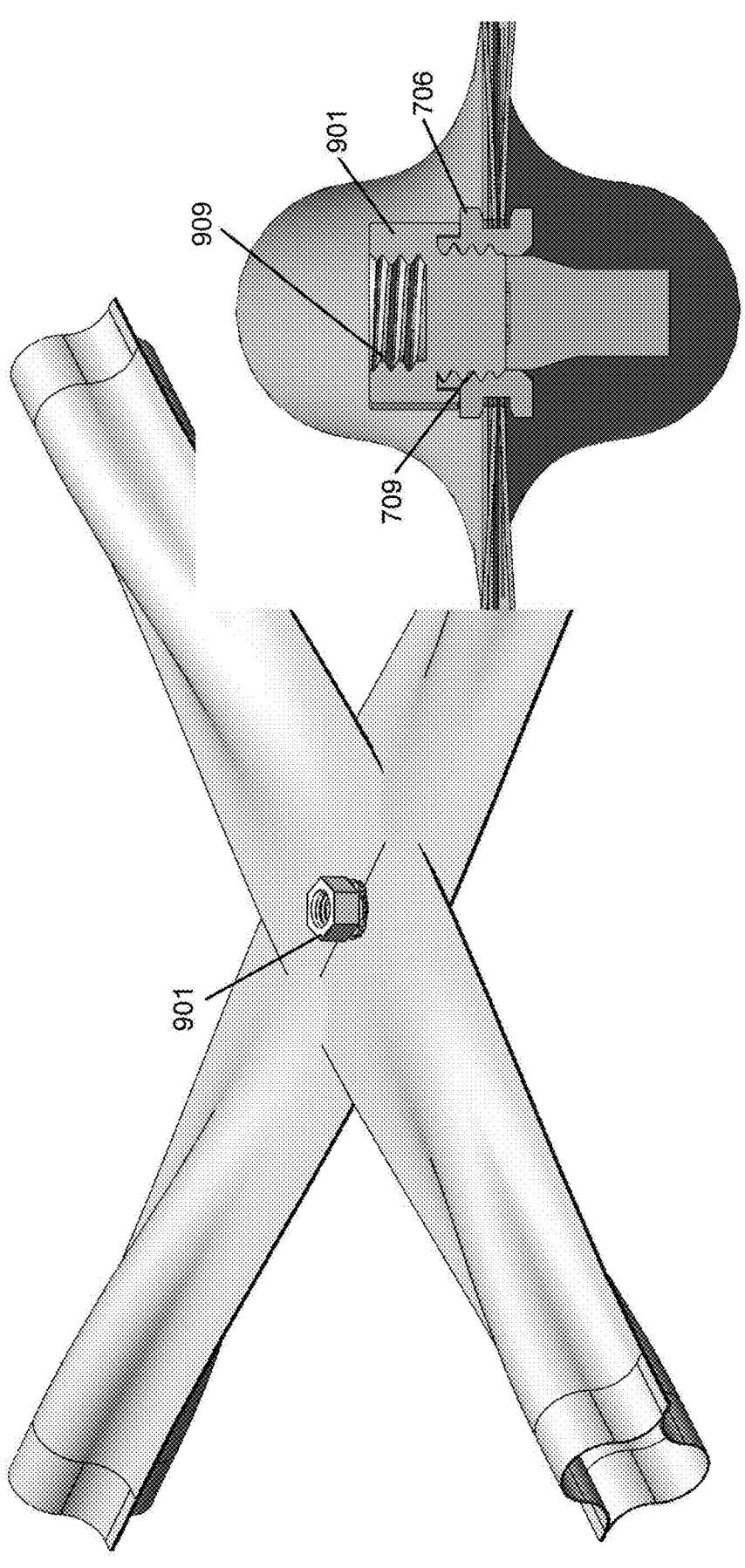
FIG. 9 is drawing showing an optional retaining nut threaded into place into internal threads of the central body.

MECHANICAL FASTENER—FIG. 7 to FIG. 9 show fastening of two struts by an exemplary mechanical fastener, a blind rivet, suitable for robotic in space assembly according to the Application.

FIG. 7 is a drawing showing the blind rivet 701 placed in a hole 799 through both struts 751, 753 to be fastened together. The exemplary blind grommet includes a central body 703 and an expanding collar with grommet groove 706. In the exemplary expanding collar with grommet groove 706, there are also collar tabs 707.

The hole (e.g. hole 799) can be premade, such as, for example, where the rolled HSC boom already includes holes disposed at regular or irregular intervals, and/or combinations thereof. Or, a printhead can include a hole cutting, hole punching, or hole drilling feature using any suitable cutting or drilling technique, including, for example, blade cutting, laser cutting, ablation cutting, and cutting by drill bit or hole saw.

In use, the blind grommet 701 is placed into hole 799, where the diameter of hole 799 is larger than an outside radius of an unexpanded collar with grommet groove 706. Optionally, the top tab parts of expanding collar with grommet groove 706 could have a slightly larger diameter to help position the blind grommet on a top surface of the outermost strut section to be fastened.

Note that the struts can be fastened at any suitable location on the strut such as at a strut end, or at other location on the strut, between ends of a strut.

FIG. 8 is a drawing showing the expanding operation of the blind grommet of FIG. 7. The central body 703 is pressed down (such as, for example, by a component of the printhead) which causes the collar with grommet groove 706 to expand outward where the collar substantially fills the hole 799, and the tab portions provide the top and bottom grommet caps which hold the two struts together. The optional central body taper helps the central body to enter and expand the expanding collar with grommet groove 706.

FIG. 9 is drawing showing an optional retaining nut 901 threaded into place into internal threads 709 of the central body 703. In the exemplary retaining nut 901 is an additional socket thread (internal thread) which can be used for installation of the nut, and/or for other structural connections by threaded parts. The retaining nut 901 prevents the central body 703 from coming out of the expanded collar with grommet groove 706. Where locking is used, any other suitable mechanical locking mechanisms can be used in place of the retaining nut.

OTHER FASTENING TYPES—Mechanical fastening by mechanical fastener (e.g., the blind grommet of FIG. 7-FIG. 9 is but one example). In addition to other suitable types of mechanical fasteners (e.g., rivets, screws, etc.), there can be joining by fusion. For example, where a boom feedstock includes a fusible or meltable material or coating, there can be fusion joining by pressing and/or heating joints.

The CASM approach can use a feedstock system and printhead to perform a variety of functions, including, for example, HSC boom feed stock driving/feeding by a feedstock system of one or more sources of HSC boom. The printhead can include HSC boom sectioning, HSC boom manipulation and HSC boom coupling/joining. Features of the feedstock system include the HSC boom feedstock carrier, or an HSC boom feedstock carrier can be part of the printhead assembly. The printhead joins the HSC booms.

Figure 12:
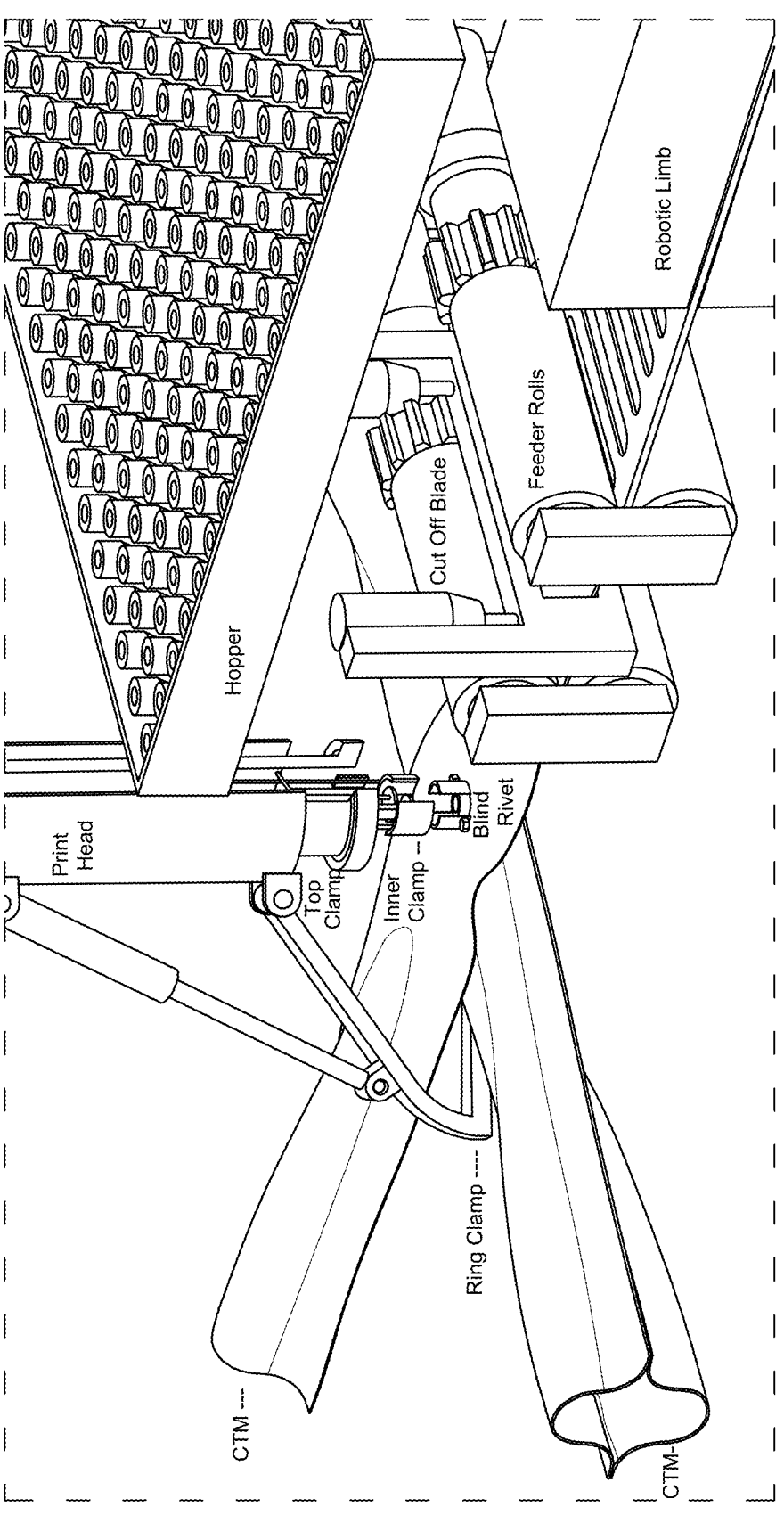
FIG. 12 is drawing showing exemplary printhead components and features.
Figure 13:
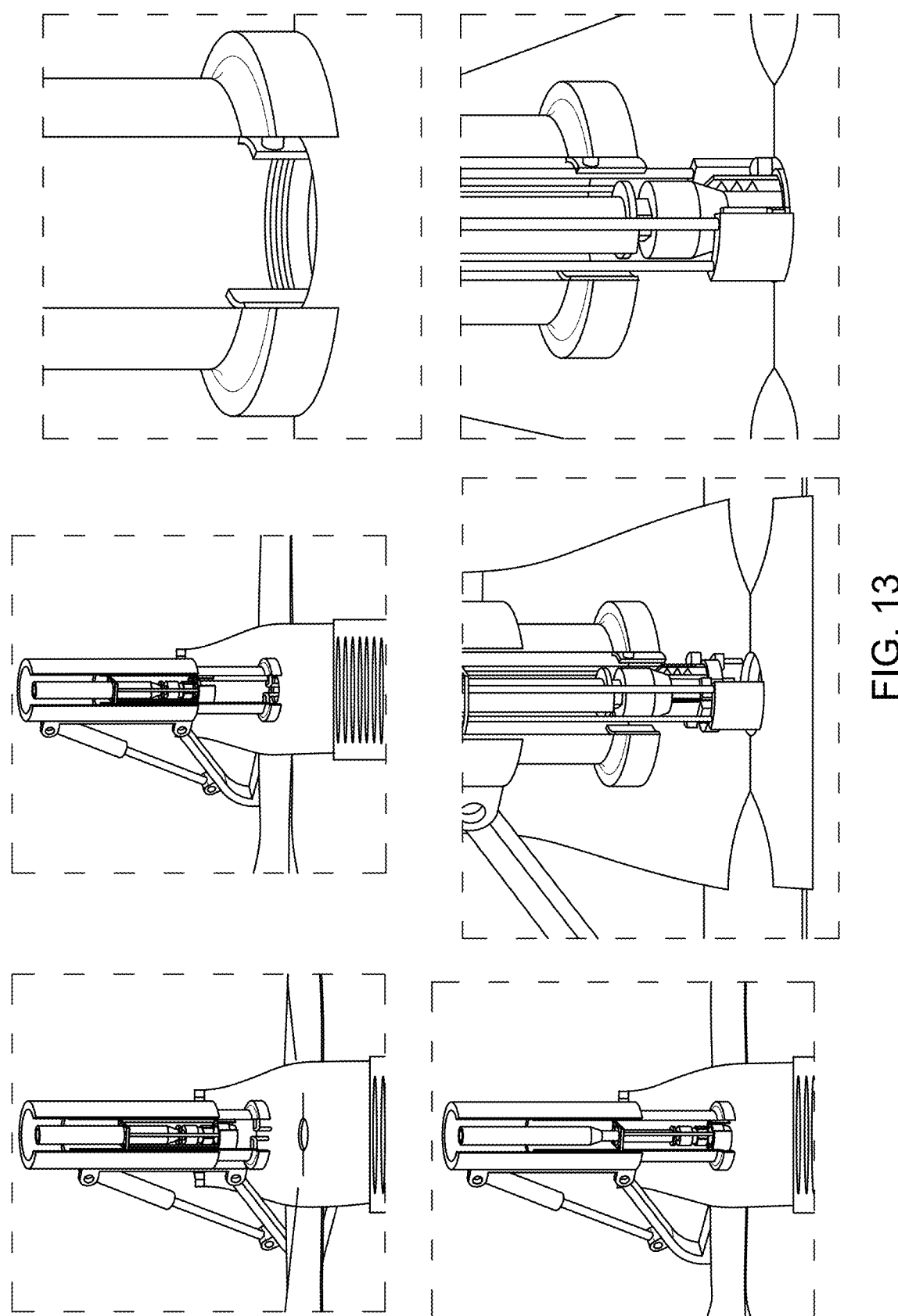
FIG. 13 is a drawing showing an exemplary printhead sequence of operation.

FIG. 12 is drawing showing exemplary printhead components and features. FIG. 13 is a drawing showing an exemplary printhead sequence of operation. The exemplary print head is aligned with the use of a robotic arm. The feed rollers dispense the collapsible tubular mast (CTM) until it is in position. A second arm can come from below to align the perpendicular CTM. Once the holes are close to aligned, the top and bottom clamps are engaged, consolidating the two CTM members. Inside the exemplary top clamp are two alignment horns that are retracted to the edge, bringing the two holes into concentricity with each other and the print head. The rivet pin (e.g., FIG. 7, central body 703) is lowered with two internal spring-loaded clamps surrounding it. Once the inner clamps are in contact with the CTM and provide the consolidation pressure, the top clamp is removed, giving space to the rivet to be inserted. The pin is pushed through the bottom clamp, expanding the rivet ring (e.g., FIG. 7, grommet groove 706 and also collar tabs 707) and securing the two CTMs together. The print head can then retract all of the clamps and the system proceeds to the next assembly point.

Figure 14:
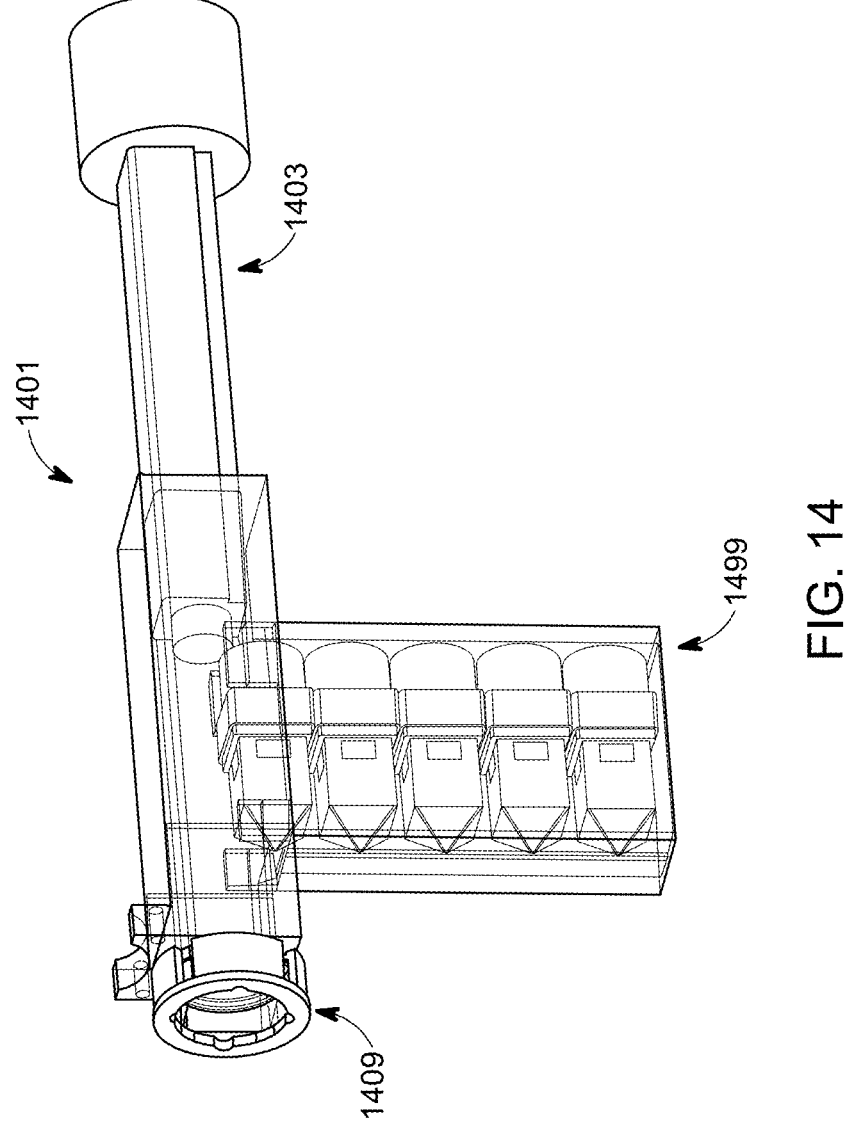
FIG. 14 is a drawing showing another printhead suitable for use with the new system and method of the Application for in-space assembly.
Figure 15:
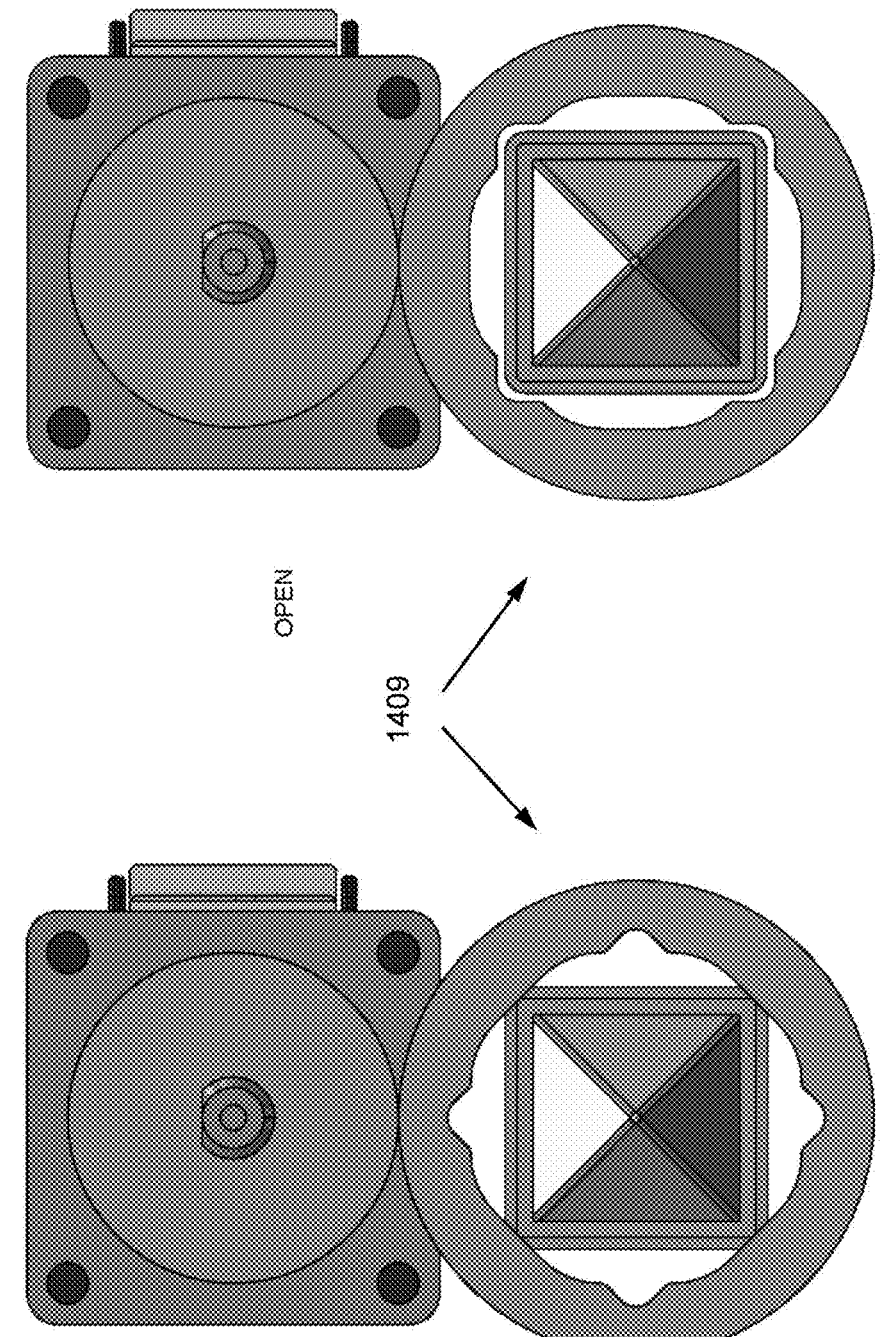
FIG. 15 is drawing showing the optional bayonet type attachment in a closed open configuration.
Figure 16:
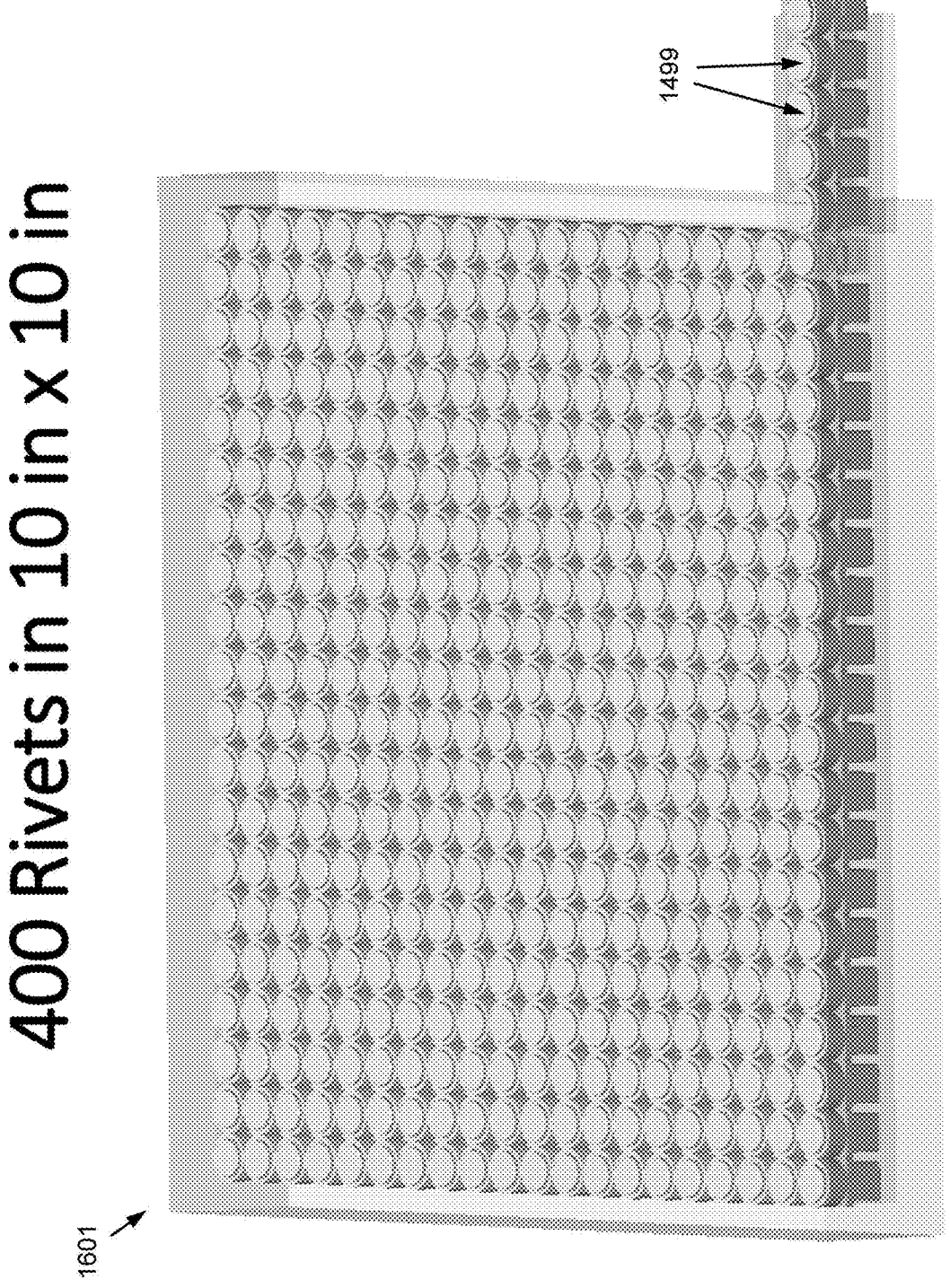
FIG. 16 is drawing showing an exemplary tray of rivets which can feed a printhead.
Figure 17:
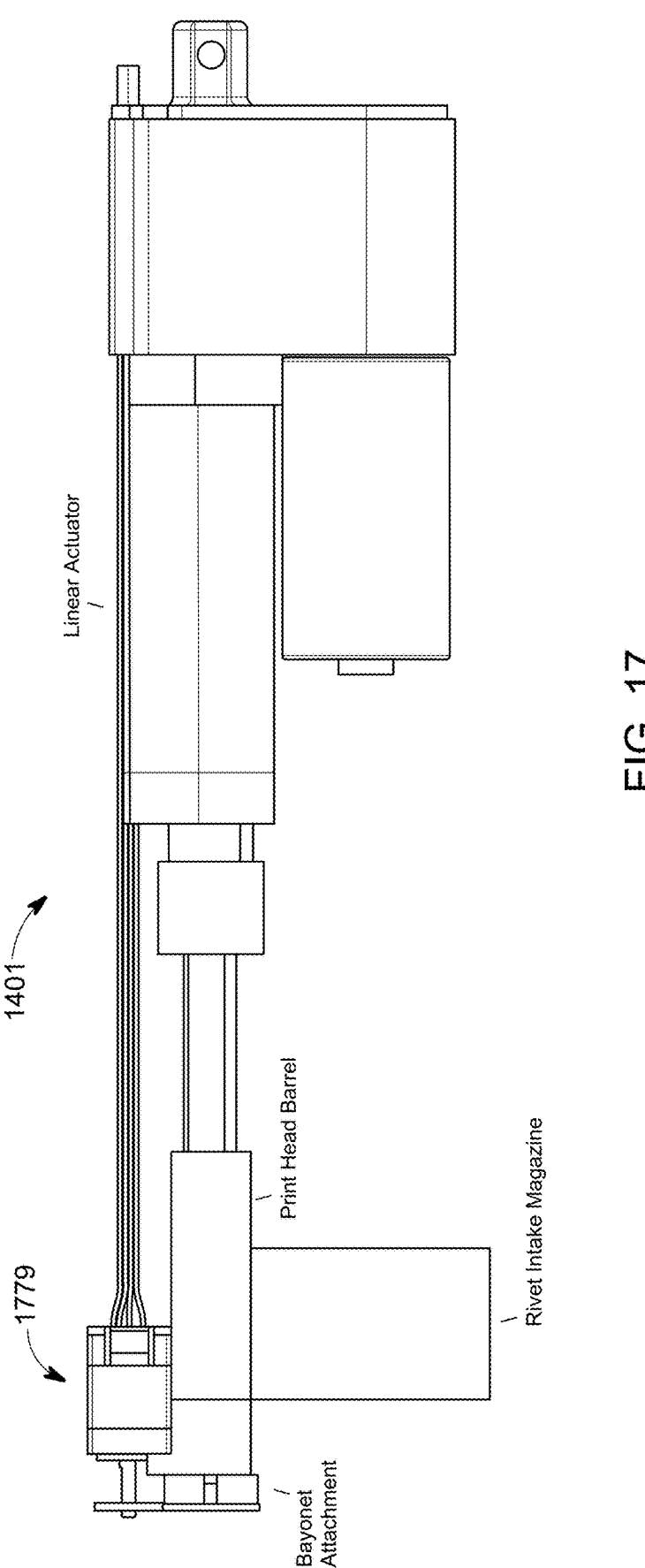
FIG. 17 is a drawing showing a printhead with a bayonet motor.
Figure 18:
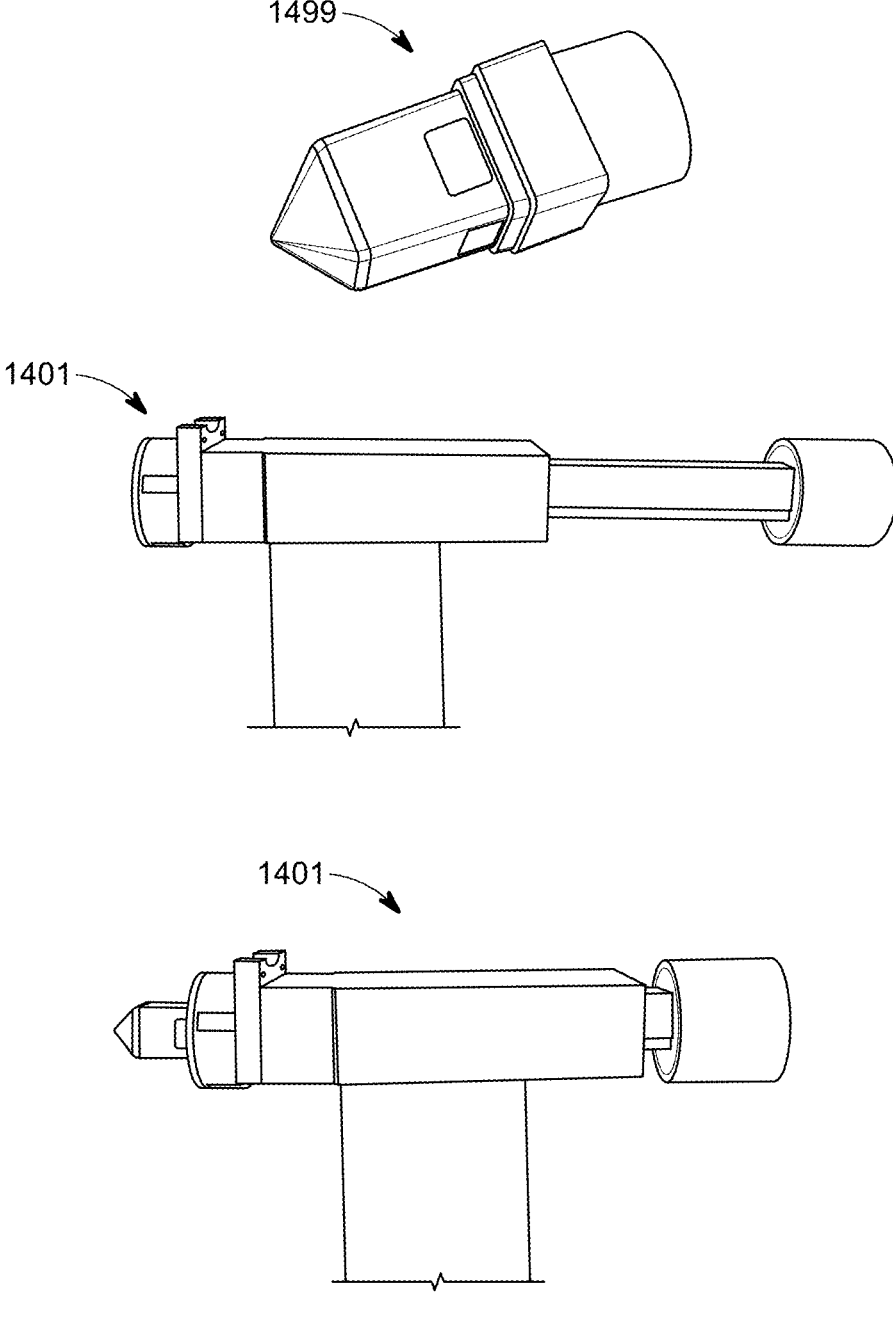
FIG. 18 is a drawing showing an experimental lab implementation of a printhead.

PRINTHEAD EXAMPLE—FIG. 14 is a drawing showing another printhead suitable for use with the new system and method of the Application for in-space assembly. Here an internal view shows an exemplary printhead 1401 with a linear actuator plunger 1403, a rivet magazine with rivets 1499 and an optional bayonet type attachment 1409. FIG. 15 is drawing showing the optional bayonet type attachment 1409 in a closed open configuration. FIG. 16 is drawing showing an exemplary tray of rivets 1499 which can feed a printhead 1401. FIG. 17 is a drawing showing a printhead 1401 with a bayonet motor 1779. FIG. 18 is a drawing showing an experimental lab implementation of a printhead 1401.

Figure 19:
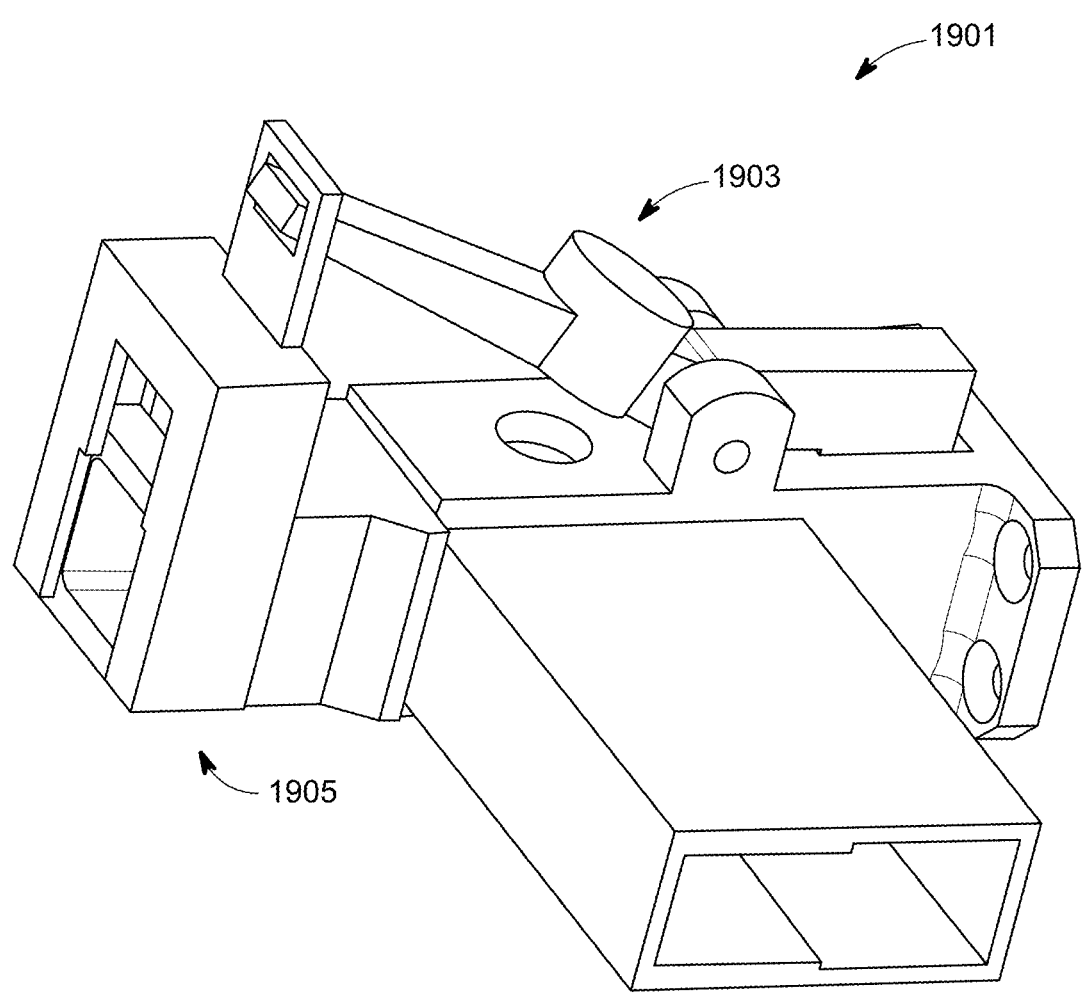
FIG. 19 is a drawing of a print head with a lever arm that slides to hold a rivet flange.
Figure 20:
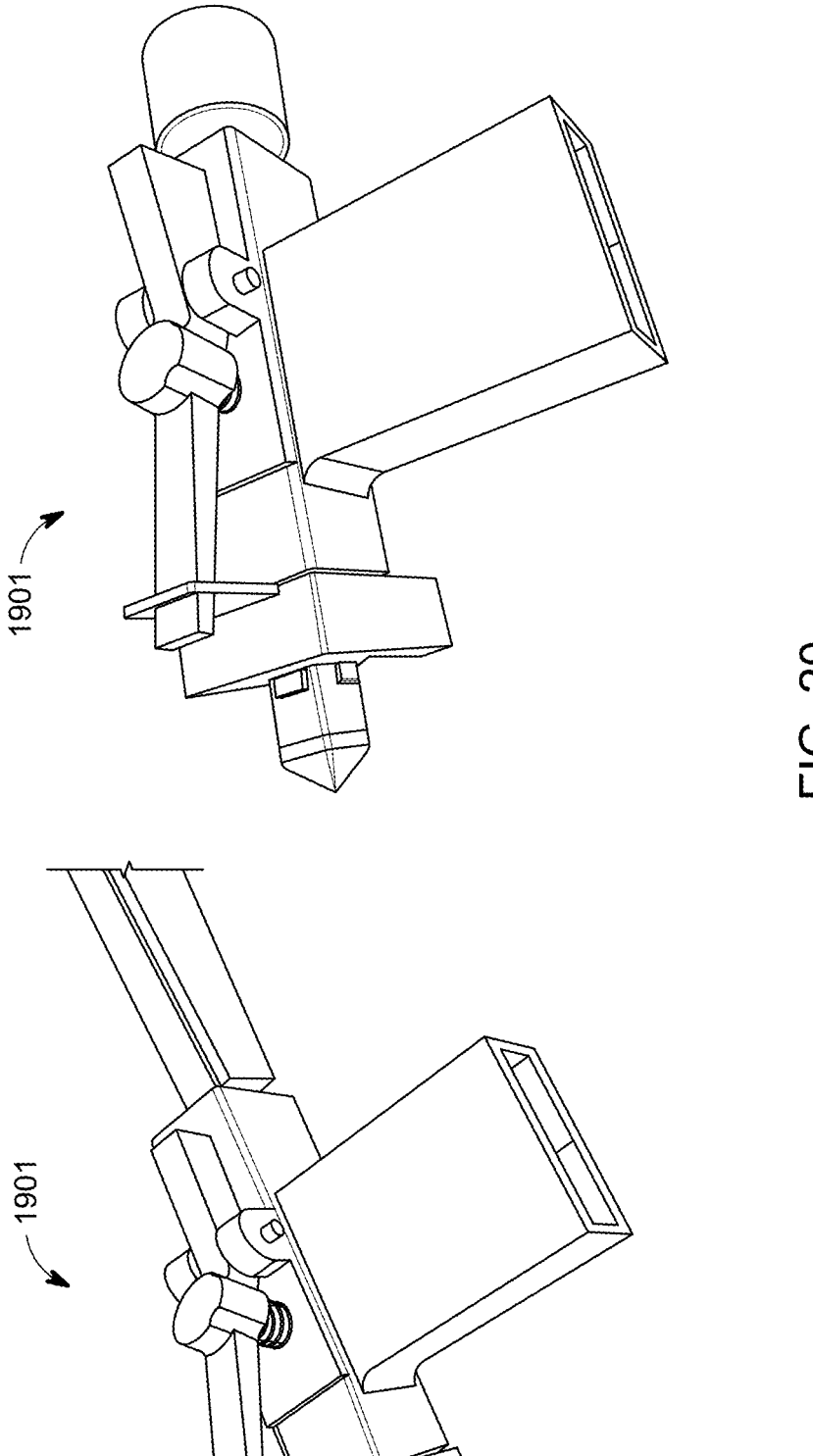
FIG. 20 is a drawing showing an experimental implementation of a printhead (left side), dispensing a rivet with a rivet flange (right side)

FIG. 19 is a drawing of a print head 1901 with a lever arm 1903 that slides to hold a rivet flange. FIG. 20 is a drawing showing an experimental implementation of a printhead 1901 (left side), dispensing a rivet with a rivet flange (right side).

Figure 21:
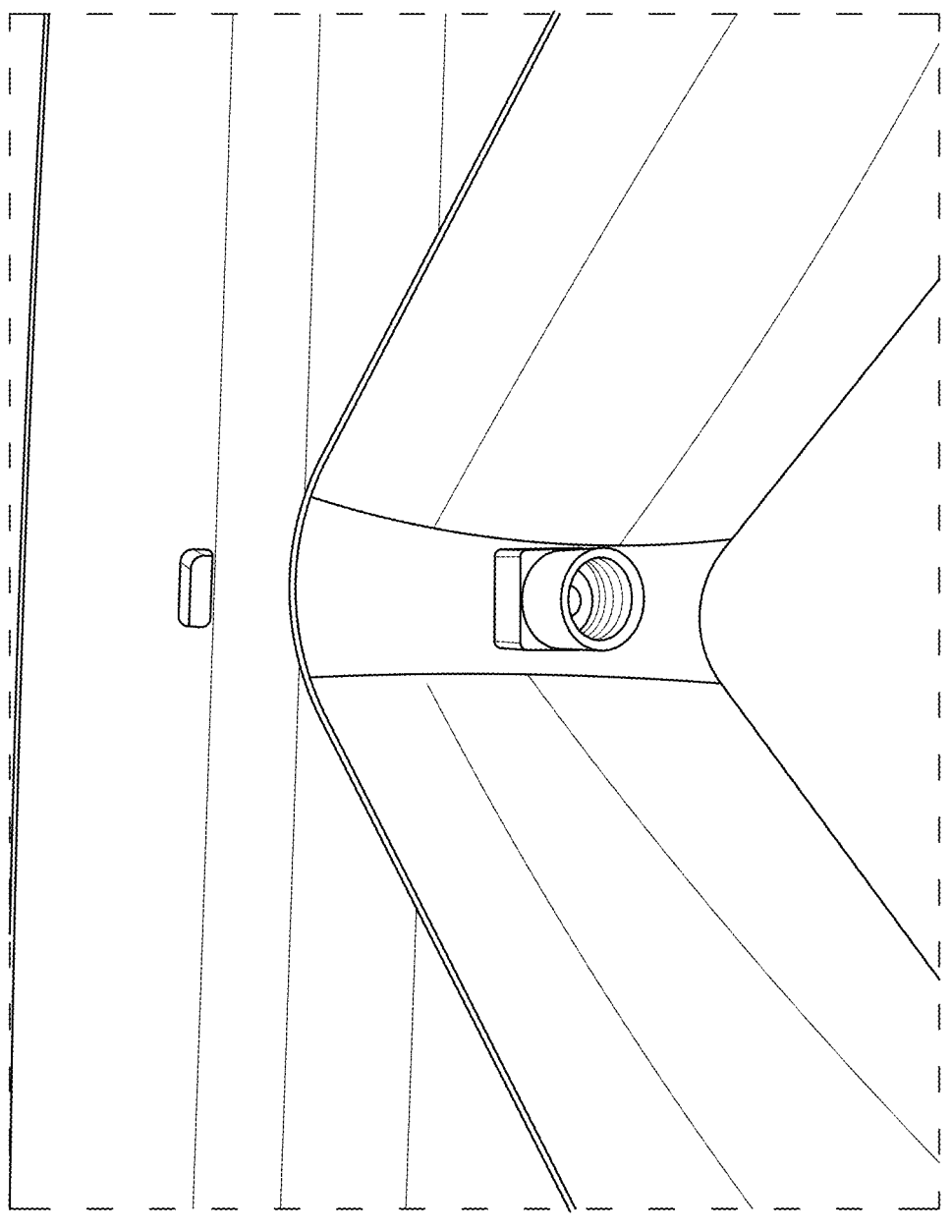
FIG. 21 is a drawing showing a joined booms using the exemplary rivets and printhead described in FIG. 19 to FIG. 20.

FIG. 21 is a drawing showing a joined booms using the exemplary rivets and printhead described in FIG. 19 to FIG. 20. Here one HSC boom forms one side of two struts of a truss, and the other HSC boom provides a longeron of the truss. Note that the holes here have an about square shape.

Rivet Examples

FIG. 22 is a drawing showing an exemplary linear spring rivet 2201 suitable for use with a printhead according to the Application. The linear spring rivet 2201 is shown in a loaded position (left side), a locked position (middle), and an internal view of the loaded position (right side), where linear spring 2203 is visible.

Figure 23:
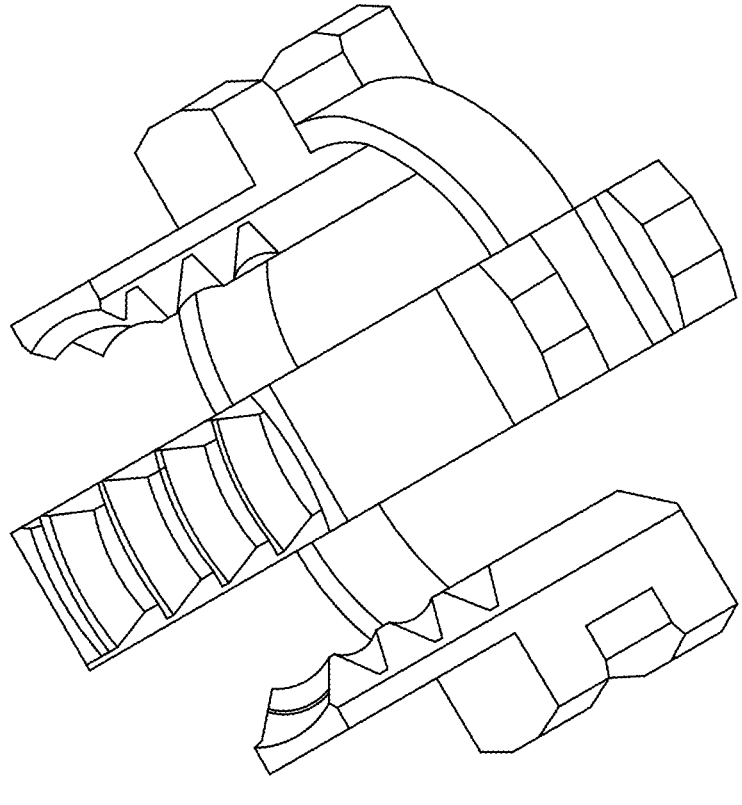
FIG. 23 is a drawing showing a part of a spring rivet compressed (left side) and expanded (right side).
Figure 23:
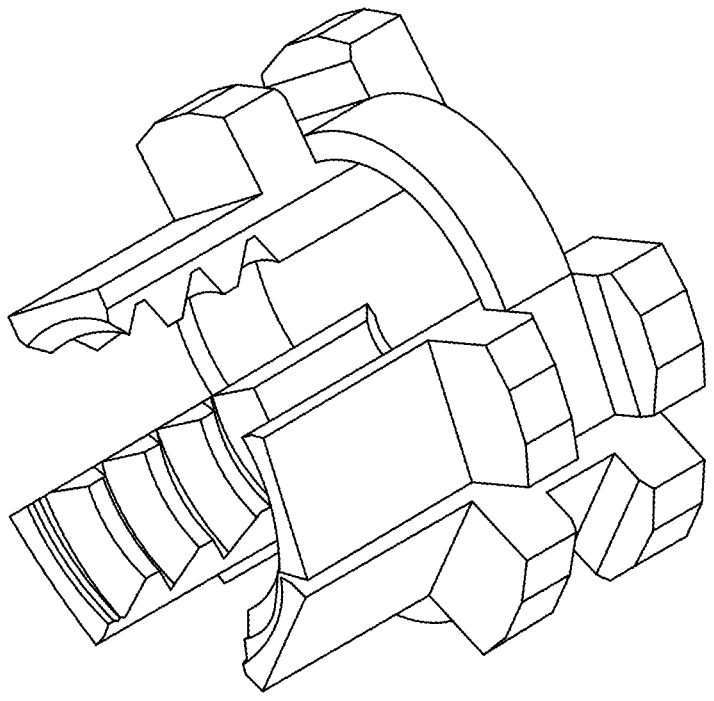

FIG. 23 is a drawing showing a part of a spring rivet compressed (left side) and expanded (right side).

Figure 24:
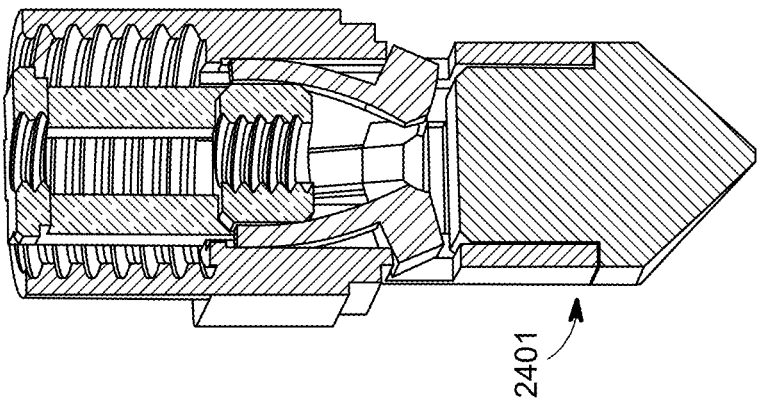
FIG. 24 is a drawing showing an exemplary lever tooth rivet suitable for use with a printhead according to the Application.
Figure 24:
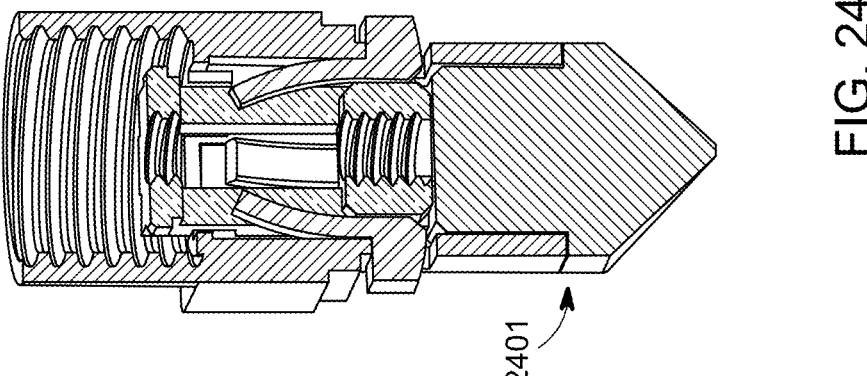
Figure 24:
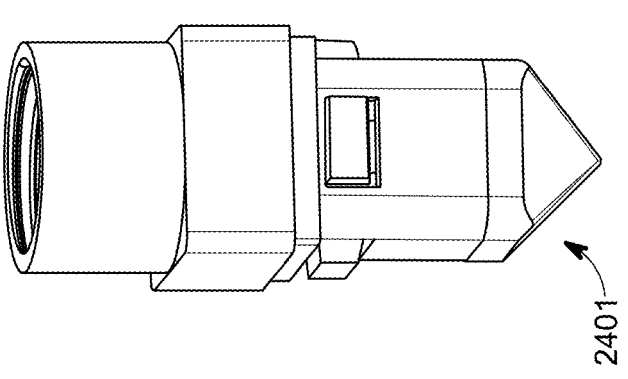

FIG. 24 is a drawing showing an exemplary lever tooth rivet 2401 suitable for use with a printhead according to the Application. The lever tooth rivet 2401 is shown left side, a cutaway view of lever tooth rivet 2401 in a locked position (middle), and a cutaway view of lever tooth rivet 2401 in a stowed position (right side).

Figure 25:
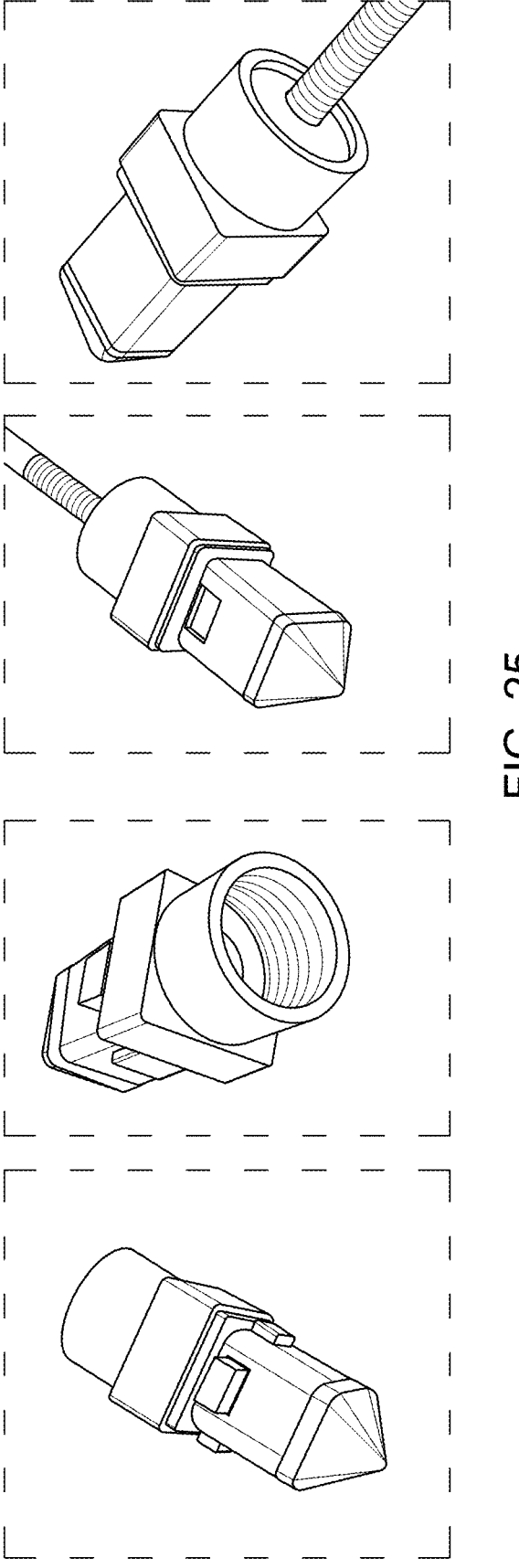
FIG. 25 is a drawing showing an exemplary implementation of a lever tooth rivet 2401, locked, front and rear view (left side) and stowed front and rear view (right side)

FIG. 25 is a drawing showing an exemplary implementation of a lever tooth rivet 2401, locked, front and rear view (left side) and stowed front and rear view (right side).

Figure 26:
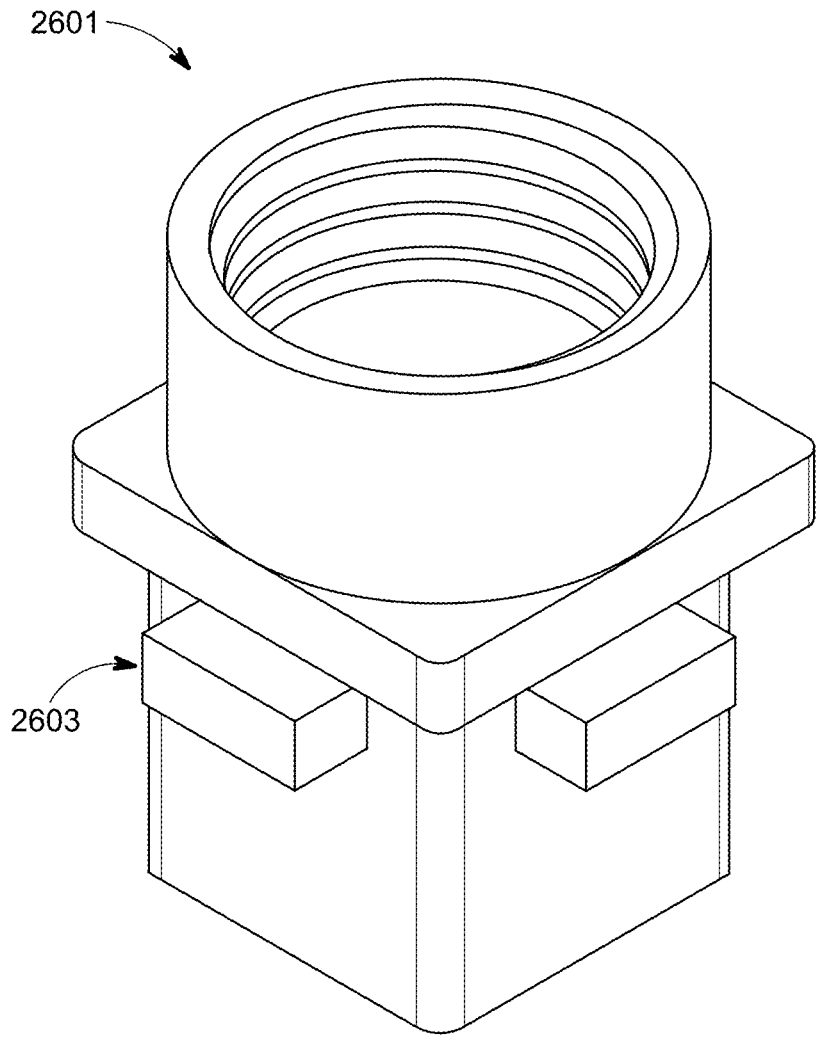
FIG. 26 is a drawing showing another exemplary square push rivet with extruding teeth.

FIG. 26 is a drawing showing another exemplary square push rivet 2601 with extruding teeth 2603.

TRUSS MANUFACTURING—Truss manufacturing can be performed using an HSC boom feed stock and printhead. Single and/or multiple, truss structures can be manufactured using the CASM approach.

STRUT LENGTHS AND STRUT CUTTING—Struts can be provided by a print head in a continuous and/or as cut struts. Both can be joined together to form structures. While a single robotic arm and printhead can be used, there can be two or more robotic arms with printheads. Two or more printheads can provide struts which can be concurrently extended, prepared for joints, and joined.

Figure 10A:
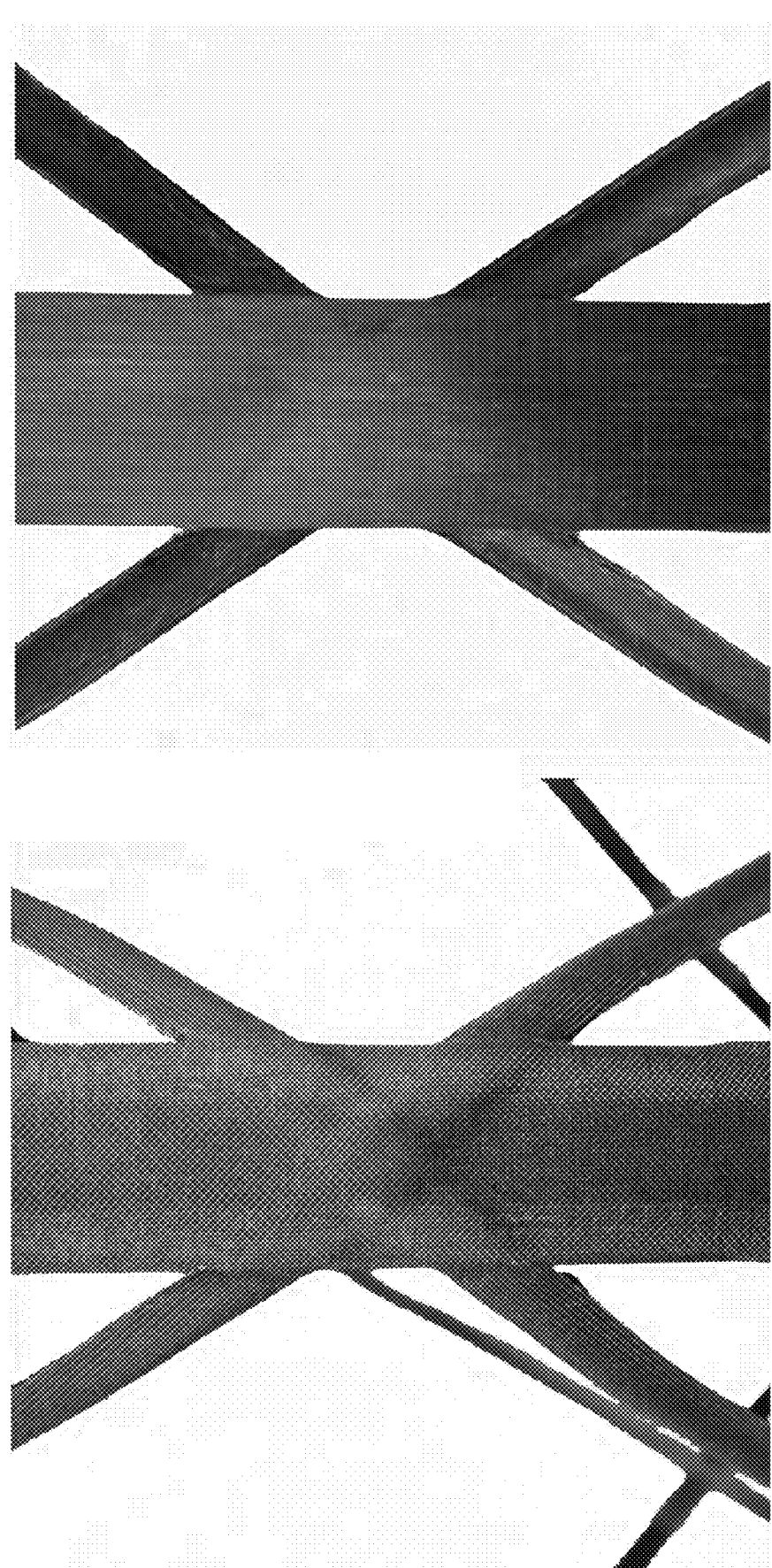
FIG. 10A is a drawing showing an exemplary longeron joint of an exemplary four bay MTS prototype exterior (left) and interior glide plane (right)
Figure 10B:
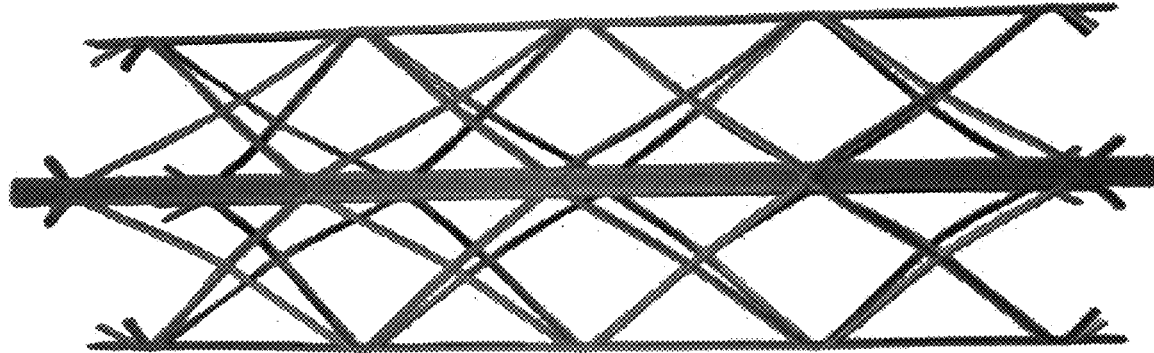
FIG. 10B is a drawing showing exemplary MTS made according to FIG. 10A.
Figure 10B:
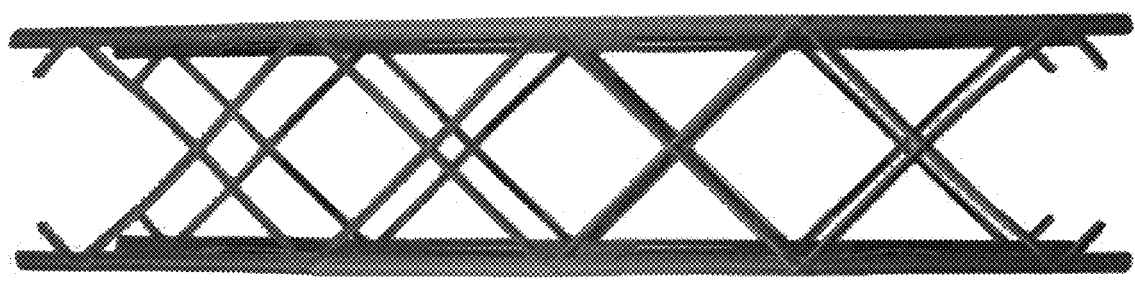

CONTINUOUS LONGERONS AND DIAGONALS—There can be continuous longerons and diagonals which are fastened together at joining portions. FIG. 10A and FIG. 10B show examples of monolithic truss segments (MTS) made with an interwoven lamina monolithic fabrication process. While a printhead could perform an interwoven lamina monolithic fabrication process, another alternative is mechanical joining at joints, such as, for example, by use of the blind grommet mechanical fastening technology of FIG. 7 to FIG. 9. FIG. 10A is a drawing showing an exemplary longeron joint of an exemplary four bay MTS prototype exterior (left) and interior glide plane (right). FIG. 10B is a drawing showing exemplary MTS made according to FIG. 10A. In continuous longerons and diagonals there can still be a printhead cut at the end of a section of manufacture, or there may be instances where to roll plays out and an end of strut is defined by the end of the feed stock roll playing out to the last strut made from that roll.

Figure 27:
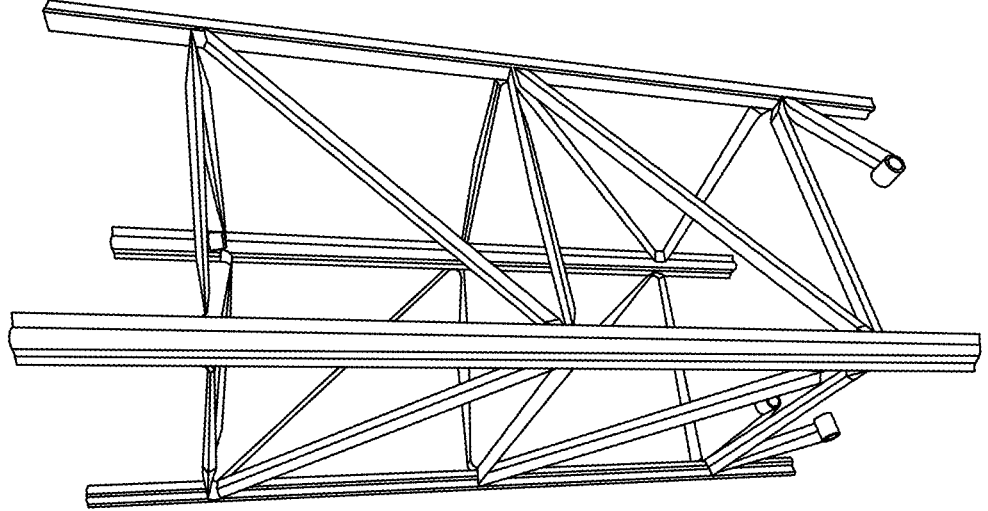
FIG. 27 is a drawing showing two exemplary 2-bay prototype tubular truss types suitable for in-space assembly.
Figure 27:
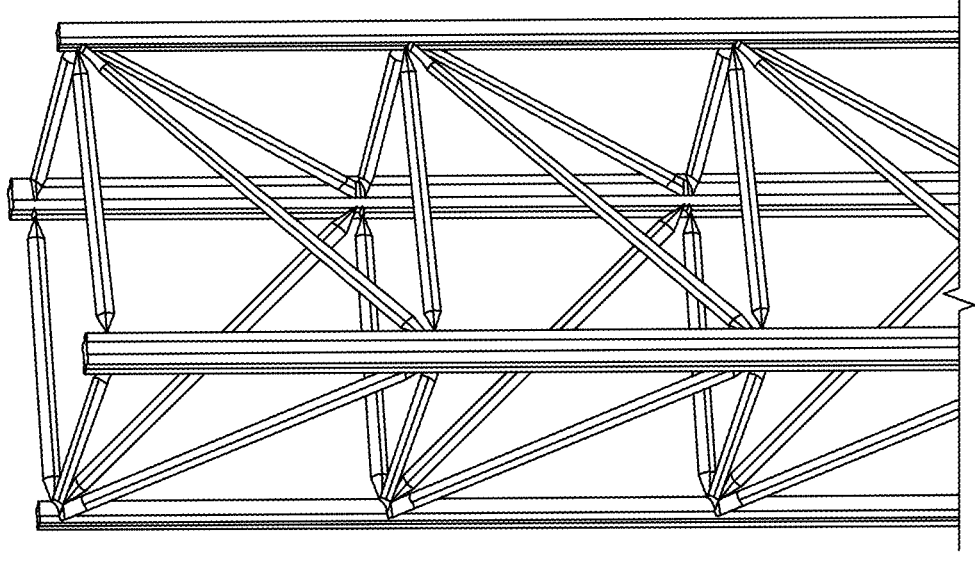

TRUSS EXAMPLES—FIG. 27 is a drawing showing two exemplary 2-bay prototype tubular truss types suitable for in-space assembly. In the example on the right, notice the rolls of HSC booms at the bottom of the drawing. The dog shows a rough scale for the size of the 2-bay truss on the right.

Figure 28:
FIG. 28 is a drawing showing a HSC boom dispenser with multiple HSC boom rolls and one printhead on a robotic arm.
Figure 28:
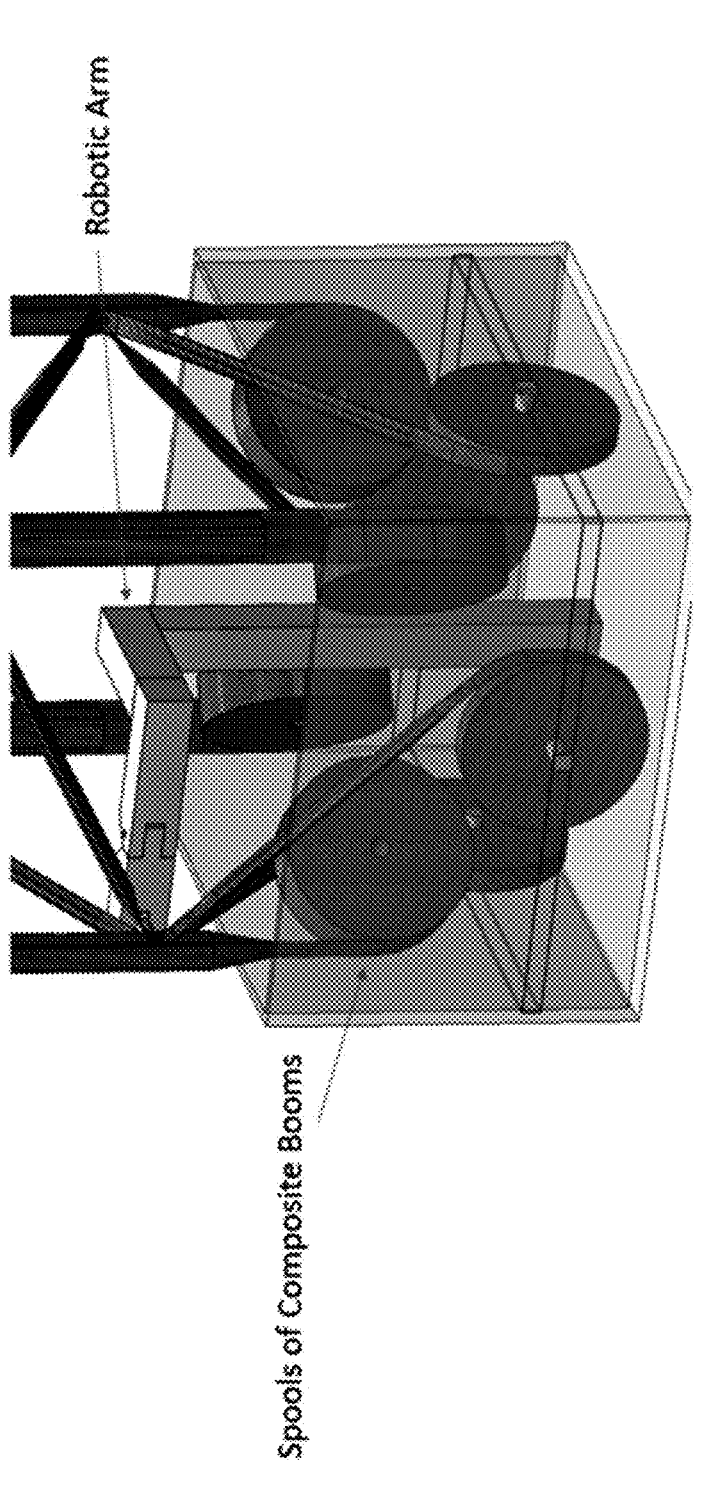

One exemplary truss system is based on a 4 longeron truss. The exemplary composite material can be extruded from 8 large spools of flattened Collapsible Tubular Mast (CTM) booms and at certain intervals a fastener will be inserted into pre-cut holes. This will occur at 4 points on connecting 2 diagonals to longerons that are opposite from each other as shown in FIG. 28. The diagonals are laced so that they meet at each attachment point which allows for a stronger truss. For each step of the assembly, two rivets can be inserted on a single longeron (one for each diagonal). This allows for assembly of a simple robotic arm with 3 points of rotation since the diagonals and longerons will be extruded out to a constant height where the rivets will be placed, securing the diagonals and longerons together.

Figure 29:
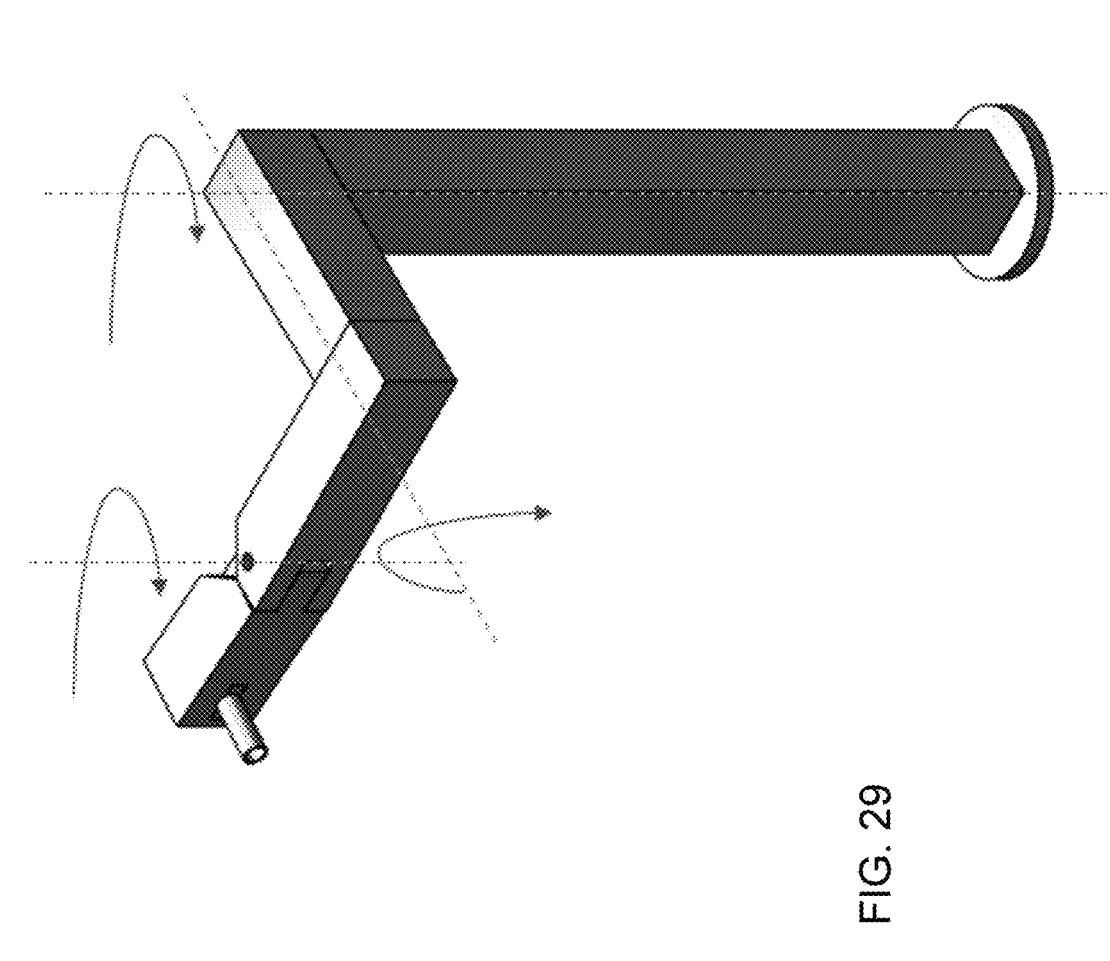
FIG. 29 is a drawing showing the exemplary robotic arm of FIG. 28.
Figure 30:
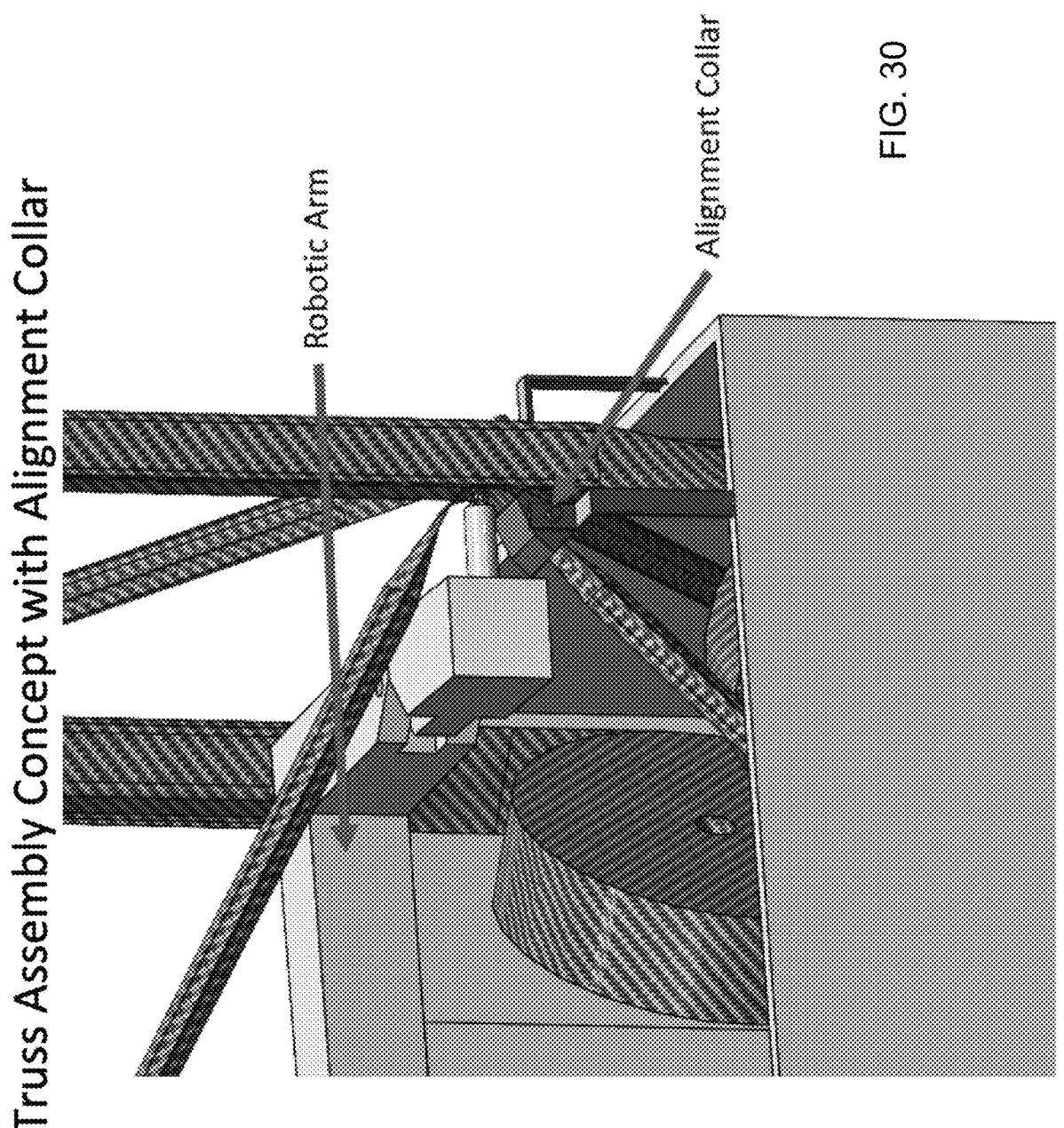
FIG. 30 is a drawing showing a multiple HSC boom roll dispenser with an alignment collar.

In this example, a robotic arm, such as the exemplary robotic arm shown in FIG. FIG. 29 can place rivets at a specific height using this assembly method thus allow for an efficient and rapid truss assembly. Each continuous diagonal can have its own alignment collar FIG. 30 which can translate between the longeron attachment points. This feature can also serve to align the holes while a rivet is inserted and control the extrusion of the diagonal member from one longeron to the other. This truss type is highly scalable both in terms of the truss and the length between the longerons.

Figure 31:
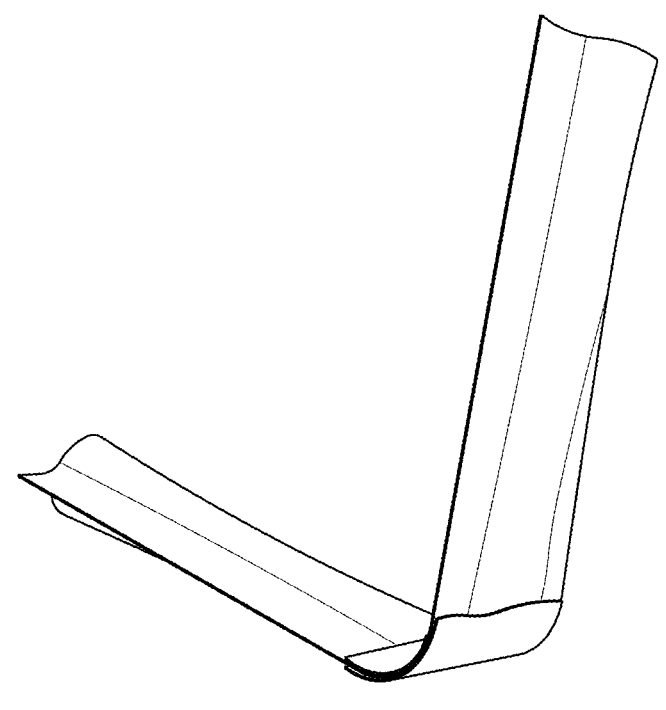
FIG. 31 is a drawing showing an optional reinforcement layer affixed on one or both sides of a compressed and bent HSC boom joint area.
Figure 31:
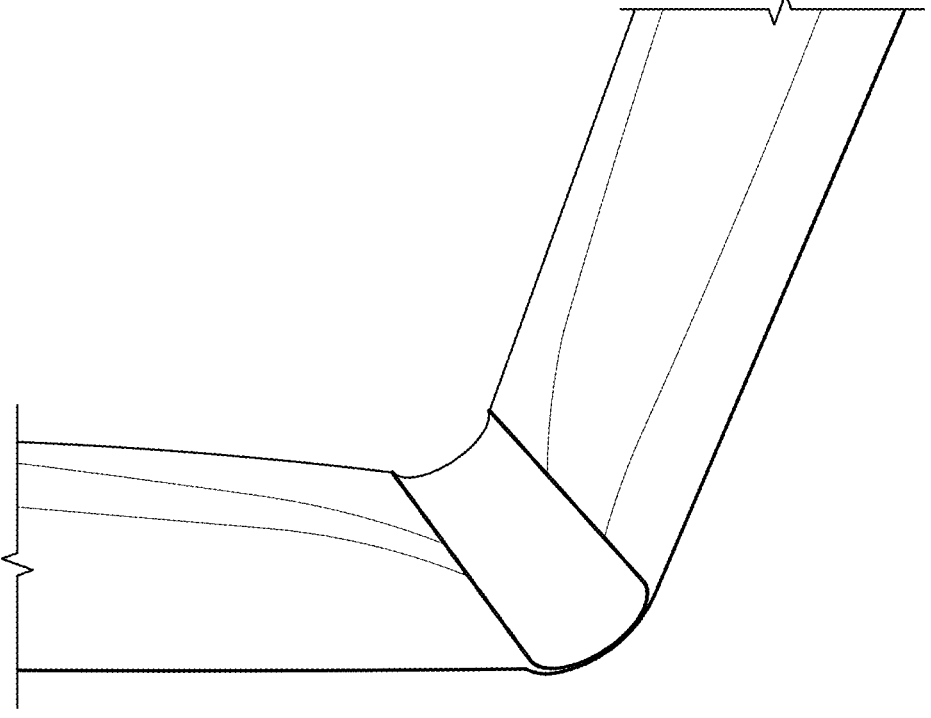

REINFORCEMENT COMPONENT—FIG. 31 is a drawing showing an optional reinforcement layer affixed on one or both sides of a compressed and bent HSC boom joint area.

DEPLOYABLE HIGH STRAIN COMPOSITE BOOMS—HSC booms enable the integration of large apertures on satellite buses. Such HSC booms decrease production costs and lead times while meeting or exceeding the performance of heritage deployable architectures.

Figure 11:
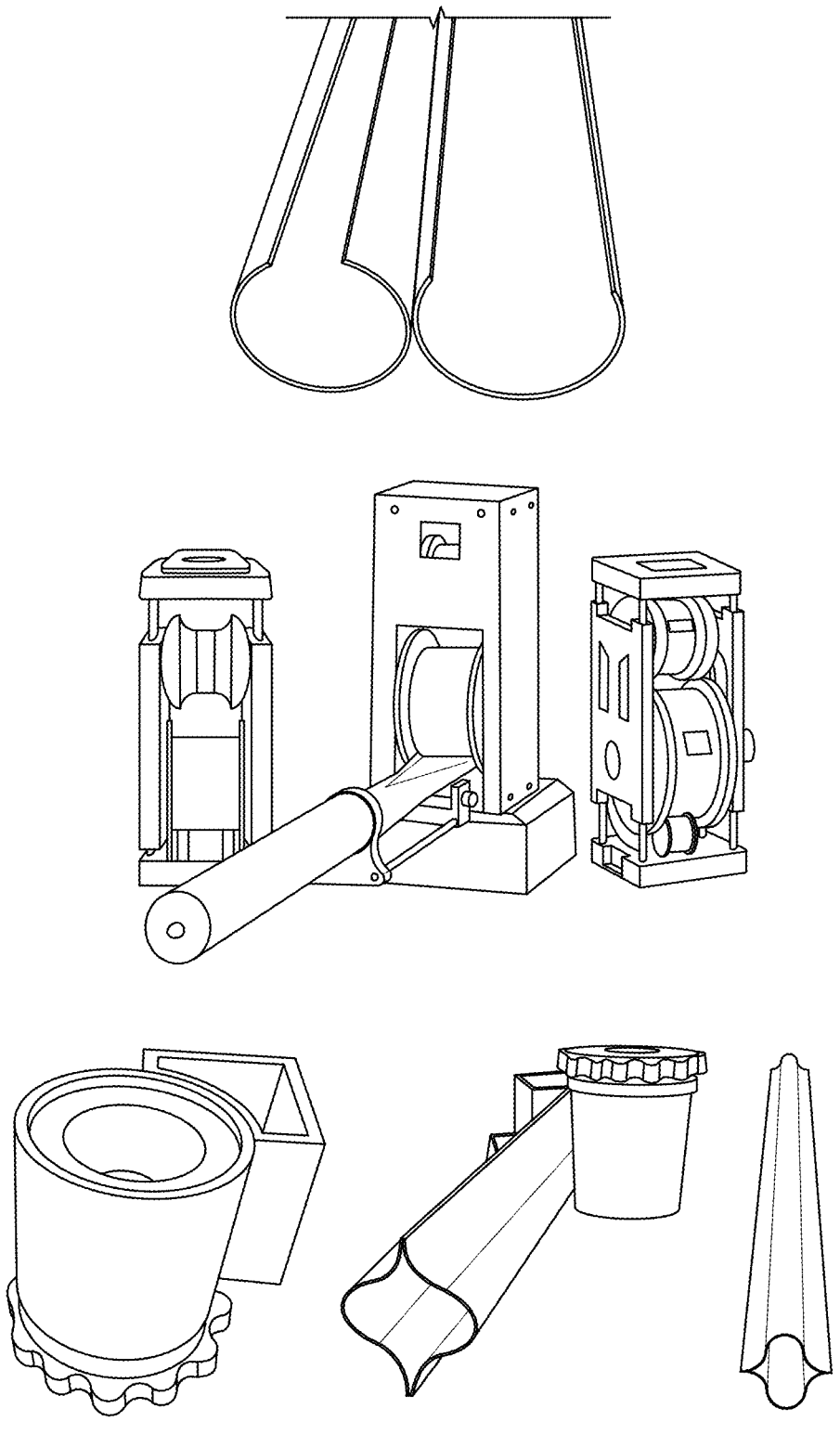
FIG. 11 is a drawing showing (from left to right) a slit tube boon, a living hinge boom & deployer, and a Collapsible Tubular Mast (CTM) boom.

FIG. 11 is a drawing showing (from left to right) a slit tube boon, a living hinge boom & deployer, and a CTM boom, exemplary components of a HSC boom dispenser system.

Suitable deformable HSC booms have been described, for example, in U.S. Pat. No. 10,526,785, DEFORMABLE STRUCTURES, and PCT Application No. PCT/US2018/029348, DEFORMABLE STRUCTURES published as WO2018200667 A1, U.S. Provisional Application No. 63/033,378, LIVING HINGE BOOM, DEFORMABLE STRUCTURES COLLAPSIBLE TUBULAR MAST (CTM), Ser. No. 16/724,806, all assigned to same Applicant of the Application, Opterus Research and Development Inc, and all of which patents and Applications are incorporated herein by reference in their entirety for all purposes.

These high strain composite booms are typically 2x stronger, 8x stiffer, 5x lighter, and 20x more dimensionally stable than alternative metallic state of the art deployable booms and masts. Featuring boom compaction ratios between 100:1-200:1, these exemplary booms can expand 10x-1000x in length, area, and volume once in orbit. Deployable booms can be rolled onto low volume spools that are deployed by unrolling to expand, tension and steer precision space structures such as reflectors, antennas, and solar array structures.

HSC boom dispenser—Any suitable dispenser or dispenser system can be used to dispense a length of HSC boom. One exemplary dispenser was described in U.S. provisional patent application Ser. No. 63/152,502, BOOM DEPLOYER, which application is incorporated herein by reference in its entirety for all purposes.

EXAMPLE-HSC boom dispenser—There can also be multiple HSC boom dispensers for more efficient in space assembly, such as in combination with one robotic arm. FIG. 28 shows an exemplary truss assembly using multiple spools of HSC booms. The robotic arm moves around the truss making successive joints between struts and longerons as the multiple spools dispense the HSC booms. FIG. 29 includes arrows showing the 3 rotational axis of an exemplary robotic arm suitable for assembling a truss with multiple spools of HSC booms playing boom out about simultaneously.

Software for modeling HSC booms and other CASM components, and for controlling CART robotic arms as well as for controlling CASM processes can be supplied on a computer readable non-transitory storage medium as non-transitory data storage. A computer readable non-transitory storage medium as non-transitory data storage includes any data stored on any suitable media in a non-fleeting manner. Such data storage includes any suitable computer readable non-transitory storage medium, including, but not limited to hard drives, non-volatile RAM, SSD devices, CDs, DVDs, etc.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A system for in-space assembly comprising:
at least one robotic arm;
at least one HSC boom dispenser;
at least one printhead mechanically coupled at about an end of said at least one robotic arm, said at least one printhead feedingly coupled to said at least one HSC boom dispenser, said at least one printhead to join two or more dispensed lengths of said at least one HSC boom dispener, said at least one printhead fed by a feedstock of a spooled high strength composite boom of said at least one HSC boom dispenser; and
wherein said at least one printhead joins two or more lengths of the at least one HSC boom dispenser as part of an in-space assembly of a structure.

2. The system of claim 1, wherein said at least one robotic arm comprising an arm position set by a combination of twisting and bending.

3. The system for of claim 1, wherein said spooled high strength composite boom comprises a braided thin-ply tape.

4. The system for of claim 1, wherein said spooled high strength composite boom comprises a reinforcement layer affixed on one or both sides of a compressed and bent HSC boom joint area.

5. The system for of claim 1, wherein said at least one HSC boom dispenser provide a plurality of lengths of high strength composite struts.

6. The system of claim 5, wherein said structure comprises a tensioned aligned antenna structure.

7. The system of claim 5, wherein said structure comprises a solar array.

8. The system of claim 5, wherein said structure comprises a parabolic mirror or a parabolic reflector.

9. A printhead to print struts for in-space assembly comprising:
a printhead frame; and
two or more feedstock wheels feedingly coupled to said printhead frame to accept a feedstock sleeve from a HSC boom dispenser.

10. The printhead of claim 9, further comprising a shear mechanically coupled to said printhead frame to cut lengths of struts.

11. The printhead of claim 9, further comprising at least one holding and fusing clamp to form ends of printed struts and to join formed printed struts to together to build a structure.

12. The printhead of claim 11, wherein said fusing clamp comprises fusing by a thermo bonding.

* * * * *